United States Patent
Ueda et al.

(10) Patent No.: US 10,725,512 B2
(45) Date of Patent: Jul. 28, 2020

(54) SIGNAL PROCESSING SYSTEM, SIGNAL PROCESSING CIRCUIT, AND RESET CONTROL METHOD

(71) Applicant: Renesas Electronics Corporation, Tokyo (JP)

(72) Inventors: Hiroshi Ueda, Tokyo (JP); Ryoji Hashimoto, Tokyo (JP); Taku Maekawa, Tokyo (JP); Katsushige Matsubara, Tokyo (JP); Keisuke Matsumoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 100 days.

(21) Appl. No.: 15/858,361

(22) Filed: Dec. 29, 2017

(65) Prior Publication Data

US 2018/0253127 A1    Sep. 6, 2018

(30) Foreign Application Priority Data

Mar. 1, 2017   (JP) .................. 2017-038223

(51) Int. Cl.
*G06F 1/24*   (2006.01)
*G06T 1/20*   (2006.01)
*G06T 1/60*   (2006.01)

(52) U.S. Cl.
CPC .............. *G06F 1/24* (2013.01); *G06T 1/20* (2013.01); *G06T 1/60* (2013.01)

(58) Field of Classification Search
CPC ............... G06F 1/24; G06T 1/60; G06T 1/20
See application file for complete search history.

(56) References Cited

U.S. PATENT DOCUMENTS

| | | | | |
|---|---|---|---|---|
| 5,583,987 A | * | 12/1996 | Kobayashi | G06F 11/006 714/11 |
| 5,870,602 A | * | 2/1999 | Miller | G06F 1/24 711/166 |
| 2016/0139955 A1 | * | 5/2016 | Fee | G06F 9/45554 718/103 |

FOREIGN PATENT DOCUMENTS

| | | | | |
|---|---|---|---|---|
| GB | 2415799 A | * | 1/2006 | ............... G06F 1/24 |
| JP | 58-033737 A | | 2/1983 | |

* cited by examiner

*Primary Examiner* — Jon Chang
(74) *Attorney, Agent, or Firm* — McDermott Will & Emery LLP

(57) ABSTRACT

A CPU needs to perform reset operation when a secondary arithmetic processing unit controlled by the CPU controls a signal processing circuit. CPU A controls module A. CPU B controls module B. Module A and module B control a signal processing circuit. CPU A and CPU B issue a reset request to the signal processing circuit. The signal processing circuit performs a reset process based on the reset request accepted from the CPU and a control origin identification signal that identifies a CPU as an origin of controlling the module having started a signal processing section.

15 Claims, 14 Drawing Sheets

SIGNAL PROCESSING SYSTEM, SIGNAL PROCESSING CIRCUIT, AND RESET CONTROL METHOD

CROSS-REFERENCE TO RELATED APPLICATIONS

The disclosure of Japanese Patent Application No. 2017-038223 filed on Mar. 1, 2017 including the specification, drawings and abstract is incorporated herein by reference in its entirety.

BACKGROUND

The present invention relates to a signal processing circuit and more specifically to a signal processing apparatus controlled by a secondary arithmetic processing unit that is controlled by a central processing unit.

The present invention relates to a signal processing system and method and more particularly to a signal processing system including the above-mentioned signal processing circuit and a reset control method in such signal processing system.

Patent literature 1 discloses a reset control system in an information processing apparatus. The information processing apparatus described in patent literature 1 is coupled to a plurality of central processing units. The information processing apparatus receives a reset request and performs a reset process. This reset request belongs to reset requests transmitted from a plurality of the central processing units and is transmitted from the currently operating central processing unit. There may be a reset request transmitted from the central processing unit not operating currently. The information processing apparatus receives such a reset request during a non-processing period after termination of the current process and performs the reset process.

Specifically, the information processing apparatus described in patent literature 1 includes a plurality of flip-flops (FF) and AND circuits corresponding to a plurality of the central processing units. The information processing apparatus sets the value of FF to "1" when the FF belongs to a plurality of FFs and corresponds to the currently operating central processing unit. Values of the other FFs are set to "0s." Each AND circuit outputs a logical product between an output from each FF and a reset request transmitted from each central processing unit. Accordingly, the reset request is received through the AND circuit only when the reset request is transmitted from the currently operating central processing unit out of a plurality of the central processing units. Reset requests transmitted from the other central processing units are blocked by the AND circuit and are therefore not received. All FFs are set to "1s" to enable reception of the reset requests transmitted by all the central processing units during the non-processing period after termination of the current process and performs the reset process.

Patent literature 1: Japanese Unexamined Patent Application Publication No. Sho 58(1983)-33737

SUMMARY

However, the reset control system described in patent literature 1 is only applicable to an apparatus in which the information processing apparatus is directly controlled from a plurality of the central processing units to transmit (issue) reset requests. The inventors found that the reset process may not be performed normally when the reset control system described in patent literature 1 is applied to a configuration in which the information processing apparatus is not directly controlled from a plurality of the central processing units to issue reset requests.

These and other objects and novel features may be readily ascertained by referring to the following description of the present specification and appended drawings.

According to an embodiment, the information processing system includes a plurality of central processing units, a secondary arithmetic processing unit controlled by the central processing units, and a signal processing circuit controlled by the secondary arithmetic processing unit. The signal processing circuit accepts a reset request issued from the central processing unit and then performs a reset process based on the accepted reset request and a control origin identification signal to identify the central processing unit as an origin of controlling the secondary arithmetic processing unit that started the process execution section of the signal processing circuit.

The above-mentioned embodiment can reset the signal processing circuit without hindering a process initiated by the central processing unit different from the central processing unit that issued the reset request.

DETAILED DESCRIPTION

Figure 1:
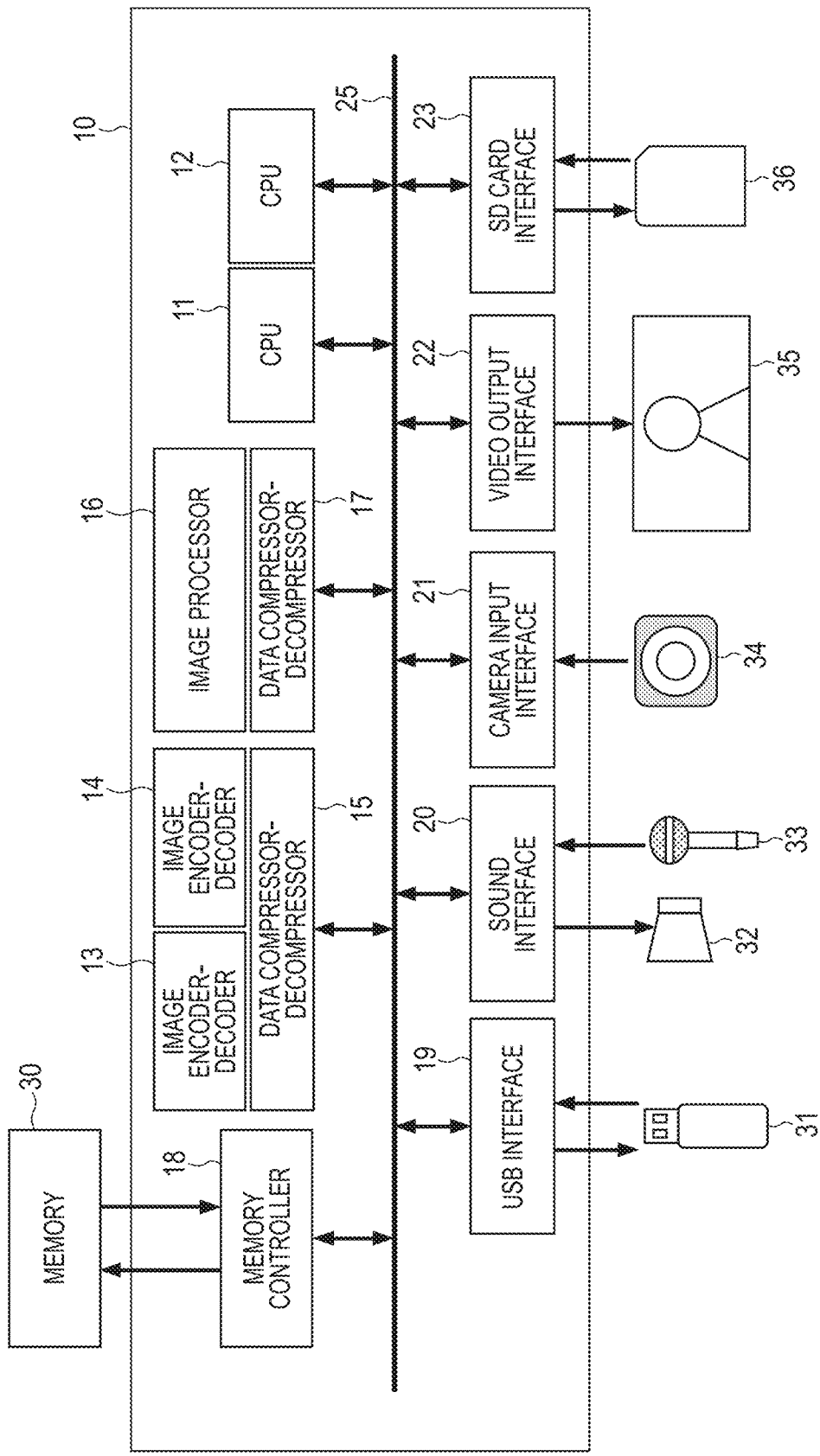
FIG. 1 is a block diagram illustrating an example of a semiconductor apparatus including a plurality of systems.

Prior to explanation of the embodiment, the background to the development of the following embodiment will be described. Recently, a plurality of systems using a plurality of hardware (H/W) platforms are replaced by a single multi-core H/W platform. FIG. 1 illustrates an example of such a system. A semiconductor apparatus 10 includes a CPU (Central Processing Unit) 11, a CPU 12, an image encoder-decoder 13, an image encoder-decoder 14, a data compressor-decompressor 15, an image processor 16, a data compressor-decompressor 17, a memory controller 18, a USB (Universal Serial Bus) interface 19, a sound interface 20, a camera input interface 21, a video output interface 22, and an SD card interface 23. The components of the semiconductor apparatus 10 are coupled to each other via a master bus 25 and are capable of communication.

The CPU 11 and the CPU 12 control the whole of the semiconductor apparatus 10 and perform various processes in the semiconductor apparatus 10. The image encoder-decoder 13 and the image encoder-decoder 14 encode and decode images. The image encoder-decoder 13 and the image encoder-decoder 14 encode and decode images by using codecs different from each other, for example. Alternatively, one of the image encoder-decoder 13 and the image encoder-decoder 14 may encode images and the other thereof may decode images. The image processor 16 performs various image processes on images. For example, the image processor 16 performs processes such as enlarging, reducing, rotating, and/or overlapping images. Alternatively, the image processor 16 may perform processes such as object recognition in ADAS (Advanced Driving Assistant System).

The data compressor-decompressor 15 and the data compressor-decompressor 17 compress and decompress data. The image encoder-decoders 13 and 14 use the data compressor-decompressor 15 to acquire image data or stream data from the master bus 25 and use the data compressor-decompressor 15 to output encoded or decoded image data or stream data to the master bus 25. The image processor 16 uses the data compressor-decompressor 17 to transmit and receive image data from the master bus 25. The use of the data compressor-decompressor 15 and the data compressor-decompressor 17 can compress bands of image data transmitted and received over the master bus 25.

The memory controller 18 controls data reading and writing to external memory 30. Similarly to the data compressor-decompressor 15, for example, the memory controller 18 includes a function that compresses data read from the memory 30, outputs the data to the master bus 25, decompresses compressed data input from the master bus 25, and writes the data to the memory 30. For example, the USB interface 19 is coupled to external USB memory 31 and controls data reading and writing to the USB memory 31. The sound interface 20 outputs audio signals to an external speaker 32. The sound interface 20 is supplied with voice signals from a microphone 33.

The camera input interface 21 is supplied with video data from an external camera 34. The video output interface 22 outputs video data to a video display apparatus 35 such as an external monitor. The SD card interface 23 controls data reading and writing to an external SD memory card 36.

In the semiconductor apparatus 10, the camera input interface 21 inputs video data that is then stored in the memory 30 via the memory controller 18. The CPU 11 starts the image encoder-decoder 13, for example. The image encoder-decoder 13 acquires video data (image data) stored in the memory 30 via the data compressor-decompressor 15, the master bus 25, and the memory controller 18, and encodes the data. The CPU 12 starts the image encoder-decoder 14, for example. The image encoder-decoder 14 acquires video data stored in the memory 30 via the data compressor-decompressor 15, the master bus 25, and the memory controller 18, and encodes the data.

The image encoder-decoder 13 and the image encoder-decoder 14 share the data compressor-decompressor 15 and cannot simultaneously access the master bus 25 while one of the image encoder-decoder 13 and the image encoder-decoder 14 accesses the master bus 25 via the data compressor-decompressor 15. An area to place the data compressor-decompressor 15 can be reduced from the semiconductor apparatus 10 because the image encoder-decoder 13 and the image encoder-decoder 14 share the data compressor-decompressor 15.

In the semiconductor apparatus 10, the data compressor-decompressor 15 operates under control of the image encoder-decoder 13 or the image encoder-decoder 14. The CPU 11 and the CPU 12 control the image encoder-decoder 13 and the image encoder-decoder 14, respectively, and are independent of which image encoder-decoder uses the data compressor-decompressor 15.

Suppose the CPU 11 or the CPU 12 resets the image encoder-decoder 13 or the image encoder-decoder 14 due to a certain cause in the semiconductor apparatus 10. The CPU 11 or the CPU 12 resets the image encoder-decoder 13 or the image encoder-decoder 14 when no response returns from the master bus 25 due to another module coupled to the master bus 25 and a hang-up event is detected, for example. In this case, the CPU 11 or the CPU 12 also resets the data compressor-decompressor 15 shared by the image encoder-decoder 13 and the image encoder-decoder 14.

However, the CPU 11 and the CPU 12 are independent of which image encoder-decoder uses the data compressor-decompressor 15. The inventors found that the CPU 12 resets the image encoder-decoder 14 and the data compressor-decompressor 15 to hinder the image encoder-decoder 13 from accessing the master bus 25 when the CPU 11 operates the image encoder-decoder 13 and the image encoder-decoder 13 accesses the master bus 25 via the data compressor-decompressor 15.

With reference to the accompanying drawings, the description below explains in detail embodiments that use means to solve the above-mentioned issue. The description and drawings are omitted and simplified as needed in order to clarify the explanation. Each element illustrated in the drawings as a function block to perform various processes can be configured as hardware including a CPU, memory, and other circuits and can be embodied as software including a program loaded into the memory. It is therefore understood by those skilled in the art that the function blocks can be embodied as hardware only, as software only, or as combinations of these and are not limited to any thereof. In the drawings, mutually corresponding elements are designated by the same reference symbols and a duplicate explanation is omitted as needed.

The above-mentioned program is stored by using various types of non-transitory computer readable medium and can be supplied to computers. The non-transitory computer readable medium includes various types of tangible storage medium. Examples of the non-transitory computer readable medium include magnetic recording media (e.g., flexible disks, magnetic tape, and hard disks), optical magnetic recording media (e.g., optical magnetic disks), CD-ROM (Read Only Memory), CD-R, CD-R/W, and semiconductor memory (e.g., mask ROM, ROM, PROM (Programmable ROM), EPROM (Erasable PROM), flash ROM, and RAM (Random Access Memory)). The program may be supplied to computers through various types of transitory computer readable medium. Examples of the transitory computer readable medium include electric signals, optical signals, and electromagnetic waves. The transitory computer readable medium can supply the program to computers via wired communication paths such as electric wires and optical fibers or wireless communication paths.

The description below may divide the embodiment into a plurality of sections or embodiments as needed. Unless explicitly specified, the divisions are not unrelated to each other. One provides a modification, an application, a detailed explanation, or a supplementary explanation about all or part of the others. The number of elements (including the number of items, values, quantities, and ranges) referred to in the following embodiments is not limited to a specific value and may be greater or smaller than or equal to the specific value except that the number of elements is explicitly specified or is obviously limited to the specific value in principle.

Constituent elements (including operation steps) of the following embodiments are not required unless explicitly specified or obviously required in principle. Similarly, shapes or positional relation of the constituent elements referred to in the following embodiments include those substantially approximate or similar to the shapes unless explicitly specified and obviously considered different in principle. The same applies to the above-mentioned number of elements (including the number of items, values, quantities, and ranges).

The following embodiments mainly describe examples of various signals set to be H (High) active but are not limited thereto. Various signals may be set to L (Low) active. Alternatively, H-active signals and L-active signals may be mixed.

First Embodiment

Figure 2:
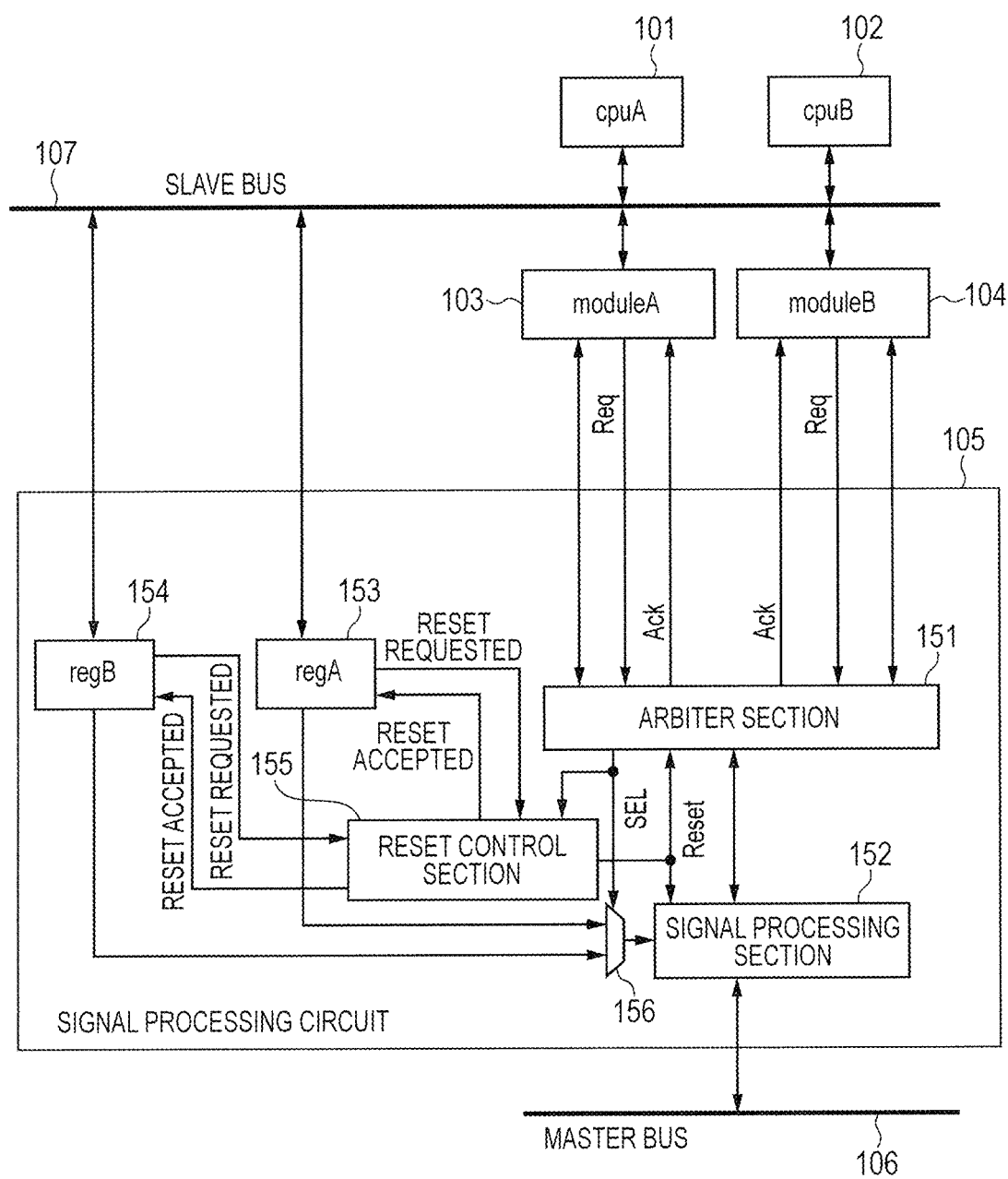
FIG. 2 is a block diagram illustrating a signal processing system according to a first embodiment.

FIG. 2 illustrates the signal processing system according to a first embodiment. The signal processing system 100 includes a CPU A 101, a CPU B 102, a module A 103, a module B 104, and a signal processing circuit 105. The CPU A 101, the CPU B 102, the module A 103, the module B 104 are coupled to a slave bus 107. The signal processing circuit 105 is coupled to a master bus 106 and the slave bus 107. The CPU A 101 and the CPU B 102 can communicate with the module A 103, the module B 104, and the signal processing circuit 105 via the slave bus 107. The module A 103 and the module B 104 can access the master bus 106 via the signal processing circuit 105.

For example, the CPU A (central processing unit A) 101 and the CPU B (central processing unit B) 102 correspond to the CPU 11 and the CPU 12 of the semiconductor apparatus 10 in FIG. 1, respectively. The module A 103 and the module B 104 are provided as secondary arithmetic processing units each controlled by the CPU A 101 and the CPU B 102, respectively. The module A 103 and the module B 104 correspond to the image encoder-decoder 13 and the image encoder-decoder 14 of the semiconductor apparatus 10 in FIG. 1, for example. The description below assumes that the CPU A 101 controls the module A 103 and the CPU B 102 controls the module B 104. FIG. 2 illustrates an example of using two CPUs and two modules as the secondary arithmetic processing units. However, the number of CPUs and secondary arithmetic processing units is not limited. There may be a configuration that uses three or more CPUs and three or more secondary arithmetic processing units.

The module A 103 and the module B 104 control the signal processing circuit 105. The signal processing circuit 105 corresponds to the data compressor-decompressor 15 of the semiconductor apparatus 10 in FIG. 1, for example. The master bus 106 corresponds to the master bus 25 of the semiconductor apparatus 10 in FIG. 1. The signal processing circuit 105 acquires compressed data from unshown memory coupled to the master bus 106, decompresses the data, and outputs the decompressed data to the module A 103 and the module B 104, for example. Alternatively, the signal processing circuit 105 acquires data from the module A 103 and the module B 104, compresses the data, and outputs the compressed data to unshown memory coupled to the master bus 106. The signal processing circuit 105 may cache image data read by the module A 103 and the module B 104, for example. Alternatively, the signal processing circuit 105 may perform look-ahead operation on images.

The CPU A 101 and the CPU B 102 control the module A 103 and the module B 104 via the slave bus 107, respectively. The CPU A 101 requests the module A 103 to start processing via the slave bus 107. The CPU B 102 requests the module B 104 to start processing via the slave bus 107.

The CPU A 101 and the CPU B 102 request the module A 103 and the module B 104 to reset via the slave bus 107 when the module A 103 and the module B 104 are reset due to a certain cause. The CPU A 101 and the CPU B 102 also request the signal processing circuit 105 to reset via the slave bus 107, while the module A 103 and the module B 104 share the signal processing circuit 105.

Signal Processing Circuit

The signal processing circuit 105 includes an arbiter section (arbitration section) 151, a signal processing section (process execution section) 152, a register section A 153, a register section B 154, a reset control section 155, and a selector 156. The signal processing section 152 is started by the module A 103 and the module B 104 to perform a signal process. The signal processing section 152 is coupled to the master bus 106, performs a signal process on data acquired from the master bus 106, and outputs the processed data to the module A 103 and the module B 104. The signal processing section 152 performs a signal process on data acquired from the module A 103 and the module B 104, and outputs the processed data to the master bus 106.

The arbiter section 151 arbitrates access requests output from a plurality of modules. When accessing the signal processing circuit 105, the module A 103 and the module B 104 each transmit access request signal Req to the signal processing circuit 105. The arbiter section 151 receives access request signal Req from the module A 103 and the module B 104 and settles (selects) one of modules to have transmitted access request signal Req as a module to start the signal processing section 152.

The arbiter section 151 settles a module to have transmitted access request signal Req at the earliest time point as a module to start the signal processing section 152, for example. A plurality of modules may transmit simultaneously transmit access request signal Req. In this case, the arbiter section 151 can settle a module to start the signal processing section 152 according to predetermined priorities. For example, suppose the module A 103 and the module B 104 simultaneously transmit access request signal Req. The arbiter section 151 then settles one the modules, for example, the module A 103 as a module to start the signal processing section 152.

The arbiter section 151 transmits acknowledgement signal Ack to the module settled as a module to start the signal processing section 152. Suppose the module A 103 is selected as a result of the arbitration, for example. The arbiter section 151 transmits acknowledgement signal Ack as a response to access request signal Req to the module A 103. Suppose the module B 104 is selected as a result of the arbitration, for example. The arbiter section 151 transmits acknowledgement signal Ack as a response to access request signal Req to the module B 104. The module A 103 and the module B 104 receive acknowledgement signal Ack from the arbiter section 151 and then start accessing the signal processing circuit 105.

The arbiter section 151 transmits selection signal SEL to the reset control section 155 and the selector 156. Selection signal SEL provides information to identify the module settled as a module to start the signal processing section 152. According to the embodiment, the CPU A 101 controls the module A 103 and the CPU B 102 controls the module B 104. Selection signal SEL is therefore comparable to a control origin identification signal that identifies the CPU as a control origin for a module to start the signal processing section 152.

Selection signal SEL is configured as two bits, for example. Each bit of selection signal SEL corresponds to each of the module A 103 and the module B 104. When selecting the module A 103 as a result of the arbitration, the arbiter section 151 generates the 2-bit value "b01" as selection signal SEL, for example. When selecting the module B 104 as a result of the arbitration, the arbiter section 151 generates the 2-bit value "b10" as selection signal SEL, for example. When selecting neither module, the arbiter section 151 generates the 2-bit value "b00" as the selection signal, for example.

The register section A 153 is coupled to the CPU A 101 via the slave bus 107. The register section A 153 stores a setup value used to perform a signal process started by the module A 103 in the signal processing section 152. The register section B 154 is coupled to the CPU B 102 via the slave bus 107. The register section B 154 stores a setup value used to perform a signal process started by the module B 104 in the signal processing section 152. Of the CPU A 101 and the CPU B 102, only the CPU A 101 may be able to access the register section A 153, for example. Of the CPU A 101 and the CPU B 102, only the CPU B 102 may be able to access the register section B 154, for example.

The selector 156 selectively outputs information such as setup values stored in the register section A 153 and information such as setup values stored in the register section B 154 to the signal processing section 152 based on selection signal SEL transmitted from the arbiter section 151. The selector 156 outputs the information such as setup values stored in the register section A 153 to the signal processing section 152 when the selection signal is set to "b01," for example. The selector 156 outputs the information such as setup values stored in the register section B 154 to the signal processing section 152 when the selection signal is set to "b10," for example.

According to the embodiment, the register section A 153 and the register section B 154 are also used as reset acceptance sections to accept reset requests from the CPU A 101 and the CPU B 102. The register section A 153 includes a reset process register that accepts a reset request issued by the CPU A 101 to the signal processing circuit 105. The register section B 154 includes a reset process register that accepts a reset request issued by the CPU B 102 to the signal processing circuit 105.

When the module A 103 is reset, the CPU A 101 writes a value indicating the event of setting the reset request to the register section A 153 via the slave bus 107. When accepting the reset request, the register section A 153 transmits a reset request signal to the reset control section 155. When the module B 104 is reset, the CPU B 102 writes a value indicating the event of setting the reset request to the register section B 154 via the slave bus 107. When accepting the reset request, the register section B 154 transmits a reset request signal to the reset control section 155.

Suppose the module A 103 is reset when the module A 103 controls the signal processing circuit 105. In this case, the arbiter section 151 and the signal processing section 152 of the signal processing circuit 105 may include incomplete information partially processed by the module A 103 to be reset. The incomplete information may affect operation of the module B 104 when the module B 104 starts accessing the signal processing circuit 105 while the signal processing circuit 105 includes the incomplete information. When resetting the module A 103, the CPU A 101 therefore needs to reset also the signal processing circuit 105. The CPU A 101 may not be able to determine whether the module A 103 is accessing the signal processing circuit 105. In this case, the 101 favorably resets the module A 103 and the signal processing circuit 105 regardless of whether the module A 103 is actually accessing the signal processing circuit 105. The above-mentioned also applies to the module B 104.

Suppose the CPU A 101 issues a reset request to the signal processing circuit 105 and the reset process is performed while the module B 104 accesses the signal processing circuit 105. In this case, processing of the module B 104 is hindered. The signal processing circuit 105 needs to be reset without hindering processes of a module started by a CPU different from the CPU that issued the reset request. For this purpose, the embodiment uses selection signal SEL generated in the arbiter section 151 to reset the signal processing circuit 105.

The reset control section 155 controls the reset process on the signal processing circuit 105. The reset control section 155 performs the reset process based on: selection signal SEL transmitted from the arbiter section 151; and the reset request signal transmitted from the register section A 153 or the register section B 154. The reset control section 155 does not perform the reset process when the CPU as an origin of controlling the module indicated by selection signal SEL differs from the CPU as an origin of issuing the reset request, for example. The reset control section 155 performs the reset process when the CPU as an origin of controlling the module indicated by selection signal SEL equals the CPU as an origin of issuing the reset request and when selection signal SEL indicates that no module starts for processing, for example.

For example, suppose the register section A 153 transmits a reset request signal and selection signal SEL is set to "b10" indicating selection of the module B 104. In this case, the reset control section 155 does not perform the reset process because the reset process hinders processing of the module B 104. For example, suppose the register section A 153 transmits a reset request signal and selection signal SEL is set to "b01" indicating selection of the module A 103 or is set to "b00" indicating selection of neither module. In this case, the reset control section 155 performs the reset process because the reset process does not hinder processing of the module B 104.

When performing the reset process, the reset control section 155 transmits reset signal Reset to the arbiter section 151 and the signal processing section 152 to reset the arbiter section 151 and the signal processing section 152. When the arbiter section 151 need not be reset, the reset control section 155 simply transmits reset signal Reset to the signal processing section 152. The reset control section 155 transmits a reset acceptance signal to the register section A 153 or the register section B 154 to notify that the reset request is accepted. When receiving the reset acceptance signal, the register section A 153 or the register section B 154 resets its own necessary portion.

As above, the register section A 153 and the register section B 154 are used as reset acceptance sections. A reset request issued by the CPU A 101 is set to the register section A 153. A reset request issued by the CPU B 102 is set to the register section B 154. However, the configuration of the reset acceptance section is not limited thereto. For example, the signal processing circuit 105 may include a shared register accessible from both CPUs. A reset request may be set to the shared register in a mode that makes it possible to identify which CPU issues the reset request. According to the embodiment, the reset acceptance section may be configured so as to be able to identify the CPU that issued the reset request. There is no limitation on a specific configuration to embody the reset acceptance section.

Normal Operation Examples

Figure 3:
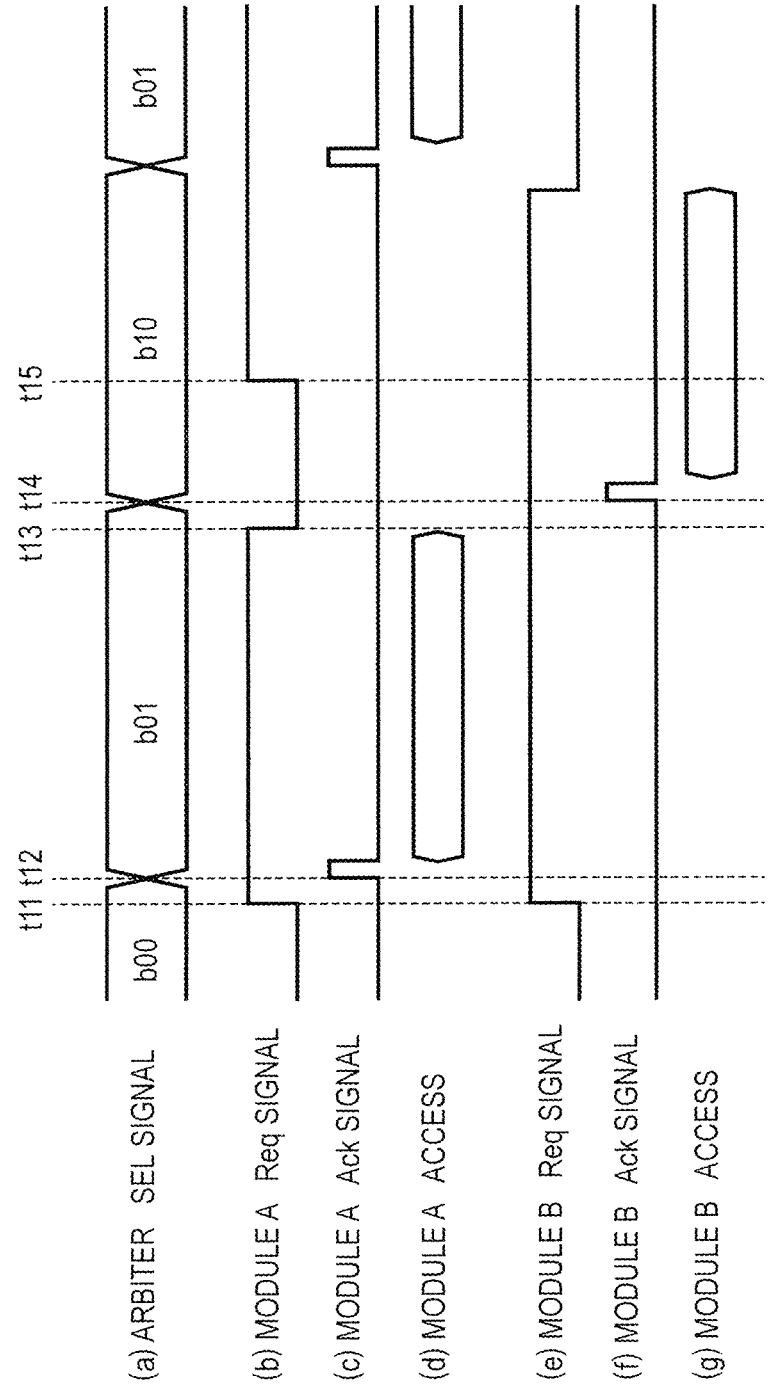
FIG. 3 is a timing chart illustrating operation waveforms of respective sections during normal operation.

FIG. 3 illustrates waveforms of respective sections during normal operation. According to the embodiment, the module A 103 and the module B 104 perform a process that, after startup, continues a signal process without intervention from the CPU A 101 and the CPU B 102 and, upon termination of the process, outputs an interrupt signal to notify the CPU A 101 and the CPU B 102 of the process termination. For example, the module A 103 and the module B 104 are assumed to perform a process corresponding to one frame for the image encoder-decoder and generate an interrupt signal each time one frame of process terminates.

The CPU A 101 and the CPU B 102 do not monitor states of modules started by the CPU A 101 and the CPU B 102 and do not recognize whether the started module is accessing the signal processing circuit 105. That is, the CPU A 101 does not recognize whether the module A 103 is accessing the signal processing circuit 105. The CPU B 102 does not recognize whether the module B 104 is accessing the signal processing circuit 105. The CPU A 101 and the CPU B 102 are assumed not to mutually recognize operational situations of the other.

The CPU A 101 sets an initial setup value in the module A 103 via the slave bus 107. The CPU A 101 accesses the register section A 153 of the signal processing circuit 105 via the slave bus 107 and stores necessary information such as an initial setup value in the register section A 153. The CPU A 101 then starts the module A 103. Similarly, the CPU B 102 similarly sets an initial setup value in the module B 104 via the slave bus 107. The CPU B 102 accesses the register section B 154 of the signal processing circuit 105 via the slave bus 107 and stores necessary information such as an initial setup value in the register section B 154. The CPU B 102 then starts the module B 104.

Initially, suppose the signal processing circuit 105 is started by neither module, and the arbiter section 151 outputs selection signal SEL set to "b00" (see (a)). At time t11, the module A 103 started by the CPU A 101 transmits access request signal Req to the signal processing circuit 105 (see (b)). In other words, the module A 103 asserts access request signal Req at the H level. At time t11, the module B 104 started by the CPU B 102 also transmits access request signal Req to the signal processing circuit 105 (see (e)). In other words, the module B 104 asserts access request signal Req at the H level.

The arbiter section 151 arbitrates the access requests and selects the module A 103 out of the two modules that transmitted access request signal Req. At time t12, the arbiter section 151 transmits acknowledgement signal Ack to the module A 103 selected in the arbitration (see (c)). At time t12, the arbiter section 151 transmits selection signal SEL set to "b01" to the reset control section 155 and the selector 156 (see (a)).

The module A 103 receives acknowledgement signal Ack, identifies selection of its own, and starts an arithmetic process. In the arithmetic process, the module A 103 accesses the signal processing circuit 105 and allows the signal processing circuit 105 to perform a signal process (see (d)). At time t12, the module B 104 does not receive acknowledgement signal Ack and waits until receiving acknowledgement signal Ack. In FIG. 3, acknowledgement signal Ack is illustrated as a one-pulse signal but is not limited thereto. Further, acknowledgement signal Ack may maintain the state of being asserted at the H level while access request signal Req is asserted at the H level.

At time t13, the module A 103 terminates the process and then negates access request signal Req at the L level. The arbiter section 151 redoes the arbitration to select the module B 104. At time t14, the arbiter section 151 transmits acknowledgement signal Ack to the module B 104 (see (f)). At time t14, the arbiter section 151 transmits selection signal SEL set to "b10" to the reset control section 155 and the selector 156 (see (a)).

The module B 104 receives acknowledgement signal Ack, identifies selection of its own, and starts an arithmetic process. In the arithmetic process, the module B 104 accesses the signal processing circuit 105 and allows the signal processing circuit 105 to perform a signal process (see (g)).

The module A 103 generates an interrupt to terminate the process. The CPU A 101 then prepares for the next arithmetic operation and starts the module A 103. At time t15, the started module A 103 transmits access request signal Req to the signal processing circuit 105 (see (b)) and waits until receiving acknowledgement signal Ack. The process on the module B 104 terminates and the arbiter section 151 selects the module A 103. The module A 103 starts accessing the signal processing circuit 105 according to the procedure as above.

Operational Procedure for Resetting

Figure 4:
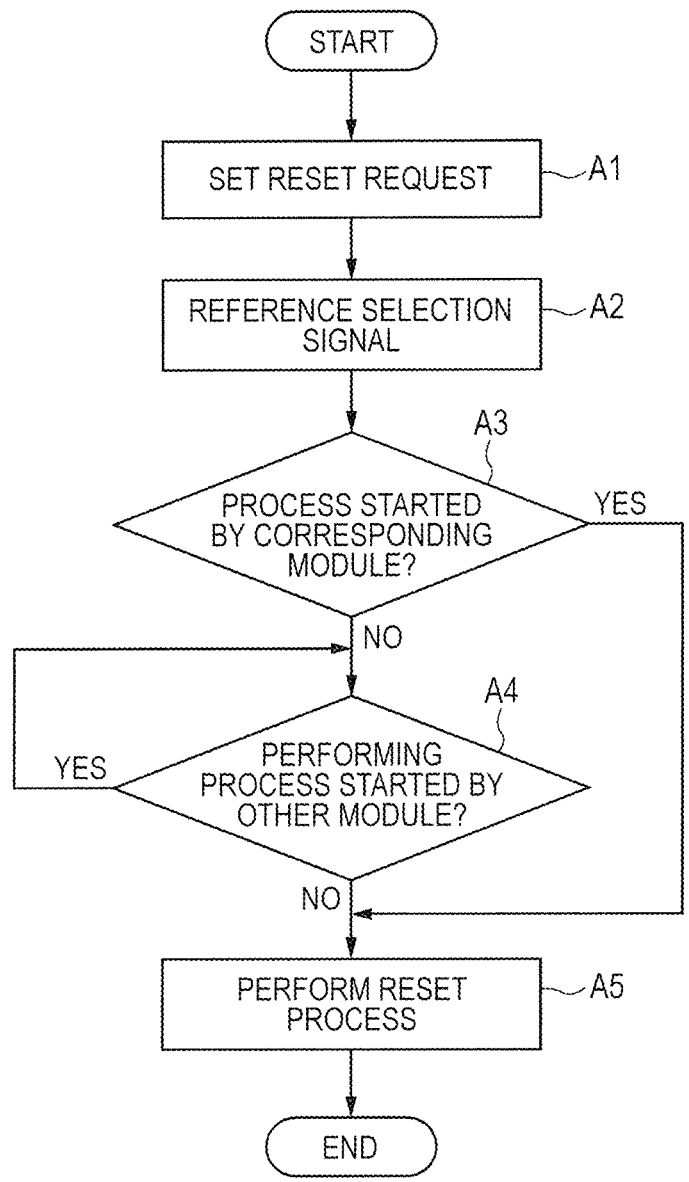
FIG. 4 is a flowchart illustrating an operational procedure during reset operation.

The description below explains an operational procedure for resetting. FIG. 4 illustrates an operational procedure for resetting. The description below explains an example where the CPU A 101 resets the module A 103 and the signal processing circuit 105. The same applies to an operational procedure when the CPU B 102 resets the module B 104 and the signal processing circuit 105.

The CPU A 101 determines to reset the module A 103 due to a certain cause. The CPU A 101 determines to reset the module A 103 and then issues a reset instruction to the module A 103 via the slave bus 107. The module A 103 receives the instruction and performs the reset process on itself. The CPU A 101 sets a reset request to the register section A 153 via the slave bus 107 (A1) in order to reset the signal processing circuit 105. When the reset request is set, the register section A 153 transmits a reset request signal to the reset control section 155.

When receiving the reset request signal, the reset control section 155 references selection signal SEL transmitted by the arbiter section 151 (A2). Based on selection signal SEL, the reset control section 155 determines whether the corresponding module starts a signal process for the signal processing section 152 (A3). At A3, selection signal SEL may be set to "b01." In this case, the reset control section 155 determines that the module A 103 corresponding to the CPU A 101 having issued the reset request starts the process.

At A3, the reset control section 155 may determine that the corresponding module starts the signal process for the signal processing section 152. In this case, the reset control section 155 transmits reset signal Reset to the arbiter section 151 and the signal processing section 152 to reset the arbiter section 151 and the signal processing section 152 (A5). The reset control section 155 transmits a reset acceptance signal to the register section A 153. When receiving the reset acceptance signal, the register section A 153 nullifies the information such as the initial setup value settled by the CPU A 101.

At A3, the reset control section 155 may determine that the corresponding module does not start the signal process for the signal processing section 152. In this case, the reset control section 155 determines whether the signal processing section 152 performs a process started by the other module (A4). At A4, selection signal SEL may be set to "b00," for example. In this case, the reset control section 155 determines that there is no process started by the other module. In this case, the reset control section 155 proceeds to A5 to perform the reset process.

At A4, selection signal SEL may be set to "b10," for example. In this case, the reset control section 155 determines that there is a process performed by the other module. The reset control section 155 repeatedly performs A4 when determining at A4 that there is a process performed by the other module, and waits until the process started by the other module terminates. The reset control section 155 proceeds to A5 and performs the reset process when the module B 104 terminates the access to the signal processing circuit 105 and selection signal SEL transmitted by the arbiter section 151 is set to "b00."

Example Operation During Reset Operation

Figure 5:
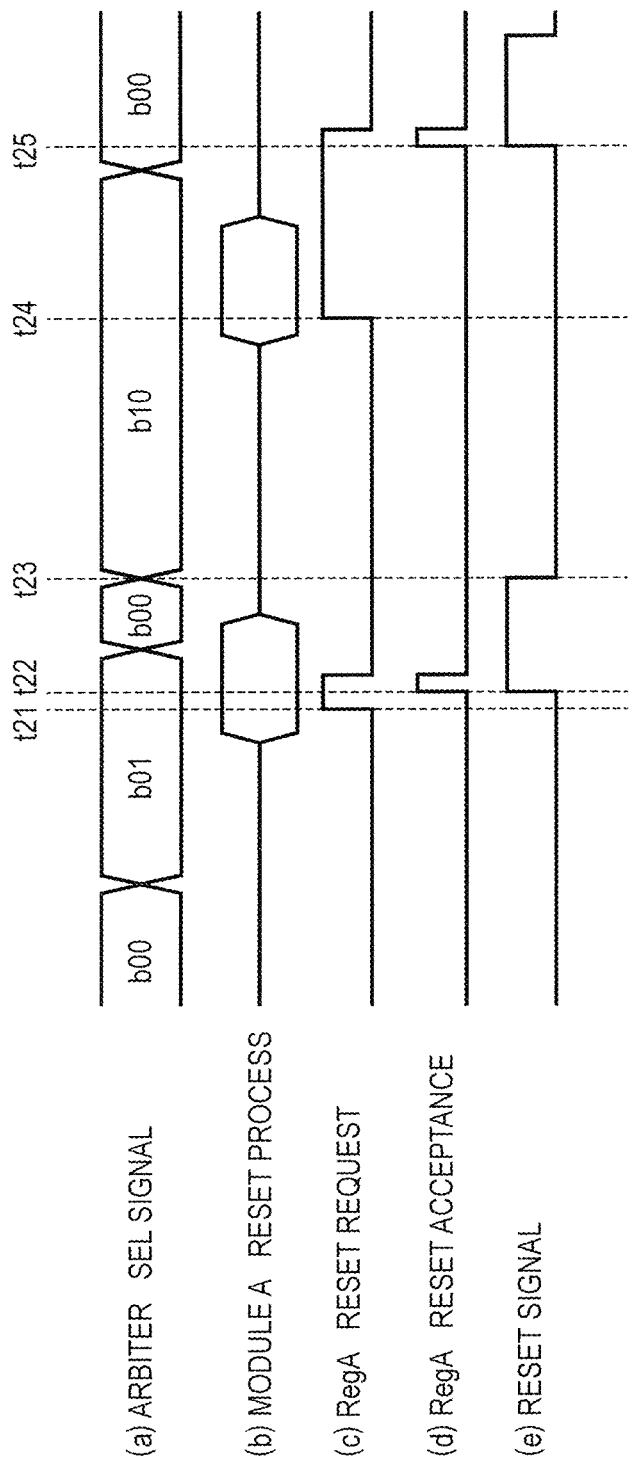
FIG. 5 is a timing chart illustrating operation waveforms of respective sections during reset operation.

FIG. 5 illustrates operation waveforms of respective sections during reset operation. Suppose the CPU A 101 starts the module A 103, the module A 103 transmits access request signal Req to the signal processing circuit 105, and the arbiter section 151 selects the module A 103. Also suppose that the CPU A 101 determines to reset the module A 103 in this state, that is, the state in which the arbiter section 151 transmits selection signal SEL set to "b01" to the reset control section 155 and the selector 156.

The CPU A 101 instructs the module A 103 to perform a reset process via the slave bus 107. The module A 103 starts the reset process in response to the instruction to perform the reset process (see (b)). At time t21, the CPU A 101 sets a reset request to the register section A 153 of the signal processing circuit 105 via the slave bus 107 in parallel with the reset on the module A 103. The register section A 153 transmits a reset request signal to the reset control section 155 (see (c)).

The arbiter section 151 transmits selection signal SEL set to "b01" at time t21 when the CPU A 101 issues the reset request. In this case, the reset control section 155 determines that the signal processing section 152 performs the process on the module A 103 controlled by the CPU A 101 having issued the reset request. At time t22, the reset control section 155 transmits a reset acceptance signal to the register section A 153 (see (d)). At time t22, the reset control section 155 transmits reset signal Reset to the arbiter section 151 and the signal processing section 152 (see (e)). When receiving the reset acceptance signal, the register section A 153 resets its own necessary portion and negates the reset request signal at the L level.

The module B 104 may transmit access request signal Req to the arbiter section 151 while or before the module A 103 is reset. In this case, the arbiter section 151 selects the module B 104 at time t23 after reset signal Reset is negated at the L level. When selecting the module B 104, the arbiter section 151 transmits selection signal SEL set to "b10" to the reset control section 155 and the selector 156 (see (a)).

The CPU A 101 may determine to reset the module A 103 at the time later than time t23. In this case, the CPU A 101 instructs the module A 103 to perform a reset process via the slave bus 107. The module A 103 starts the reset process in response to the instruction to perform the reset process (see (b)). At time t24, the CPU A 101 sets a reset request to the register section A 153 of the signal processing circuit 105 via the slave bus 107 in parallel with the reset on the module A 103. The register section A 153 transmits a reset request signal to the reset control section 155 (see (c)).

At time t24, the module B 104 controls the signal processing circuit 105. Selection signal SEL set to "b10" is transmitted from the arbiter section 151. In this case, resetting the signal processing circuit 105 hinders an access from the module B 104. The reset control section 155 therefore waits until the module B 104 terminates the process. At time t25, the reset control section 155 transmits a reset acceptance signal to the register section A 153 when selection signal SEL transmitted from the arbiter section 151 changes to "b00" (see (d)). At time t25, the reset control section 155 also transmits reset signal Reset to the arbiter section 151 and the signal processing section 152 (see (e)).

Overview

According to the embodiment, the reset control section 155 of the signal processing circuit 105 controls operation of the reset process based on: selection signal SEL transmitted from the arbiter section 151, that is, the information about the module having started the process of the signal processing section 152; and the reset request signal transmitted from the register section A 153 or the register section B 154. The reset control section 155 does not perform the reset process when no reset request signal is transmitted from the register corresponding to the CPU that controls the module having started the process of the signal processing section 152. The reset control section 155 performs the reset process when: a reset request signal is transmitted from the register corresponding to the CPU that controls the module having started the process of the signal processing section 152; or no module starts the signal processing section 152. The CPU A 101 and the CPU B 102 may not be able to determine whether the module A 103 and the module B 104 are accessing the signal processing circuit 105 shared by both modules. Even in such a case, the CPU A 101 and the CPU B 102 can reset the signal processing circuit 105 without hindering a process of the module different from the module to be controlled by the CPU A 101 and the CPU B 102.

Second Embodiment

Figure 6:
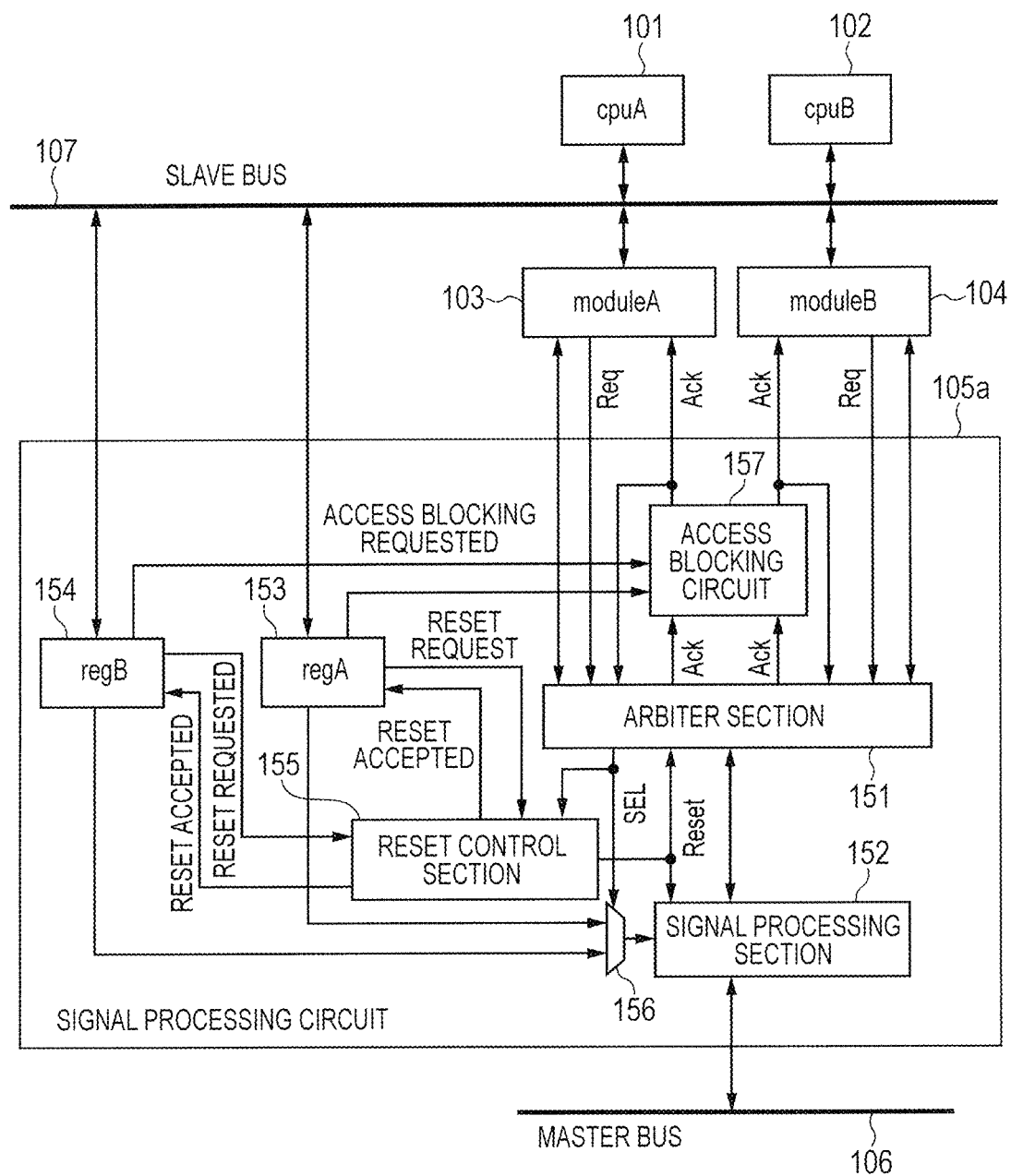
FIG. 6 is a block diagram illustrating a signal processing system according to a second embodiment.

A second embodiment will be described. FIG. 6 illustrates the signal processing system according to the second embodiment. A signal processing system 100a according to the embodiment mainly differs from the signal processing system 100 in FIG. 2 according to the first embodiment in that a signal processing circuit 105a additionally includes an access blocking circuit (access blocking section) 157. Otherwise, the signal processing system 100a may be comparable to the first embodiment.

According to the embodiment, the register section A 153 and the register section B 154 are each used as an access blocking setup acceptance section that accepts an access blocking request from the CPU A 101 and the CPU B 102. The register section A 153 includes an access blocking setup register that accepts an access blocking request issued from the CPU A 101 to the signal processing circuit 105*a*. When accepting the access blocking request, the register section A 153 transmits an access blocking request signal to the access blocking circuit 157. The register section B 154 includes an access blocking setup register that accepts the access blocking request issued from the CPU B 102 to the signal processing circuit 105*a*. When accepting the access blocking request, the register section B 154 transmits an access blocking request signal to the access blocking circuit 157.

The access block circuit 157 is placed between a group of the module A 103 and the module B 104 and the arbiter section 151. The access block circuit 157 receives an access blocking request signal, if any, from the register section A 153 or the register section B 154 and then blocks acknowledgement signal Ack corresponding to the module that transmits access request signal Req output from the arbiter section 151.

The CPU A 101 and the CPU B 102 set an access blocking request to the register section A 153 and the register section B 154 before issuing a reset request to the module A 103 and the module B 104. In more detail, the CPU A 101 writes a value to the register section A 153 via the slave bus 107 before resetting the module A 103 so that the value indicates that the access blocking request is set. The CPU B 102 writes a value to the register section B 154 via the slave bus 107 before resetting the module B 104 so that the value indicates that the access blocking request is set.

The register section A 153 nullifies the access blocking request when the reset process terminates on the signal processing circuit 105*a*. The register section B 154 nullifies the access blocking request when the reset process terminates on the signal processing circuit 105*a*. After nullifying the access blocking request, the register section A 153 and the register section B 154 negate the access blocking request signal at the L level to be transmitted to the access block circuit 157. When the access blocking request signal is negated at the L level, the access block circuit 157 transmits blocked acknowledgement signal Ack to the module A 103 or the module B 104.

Access Blocking Circuit

Figure 7:
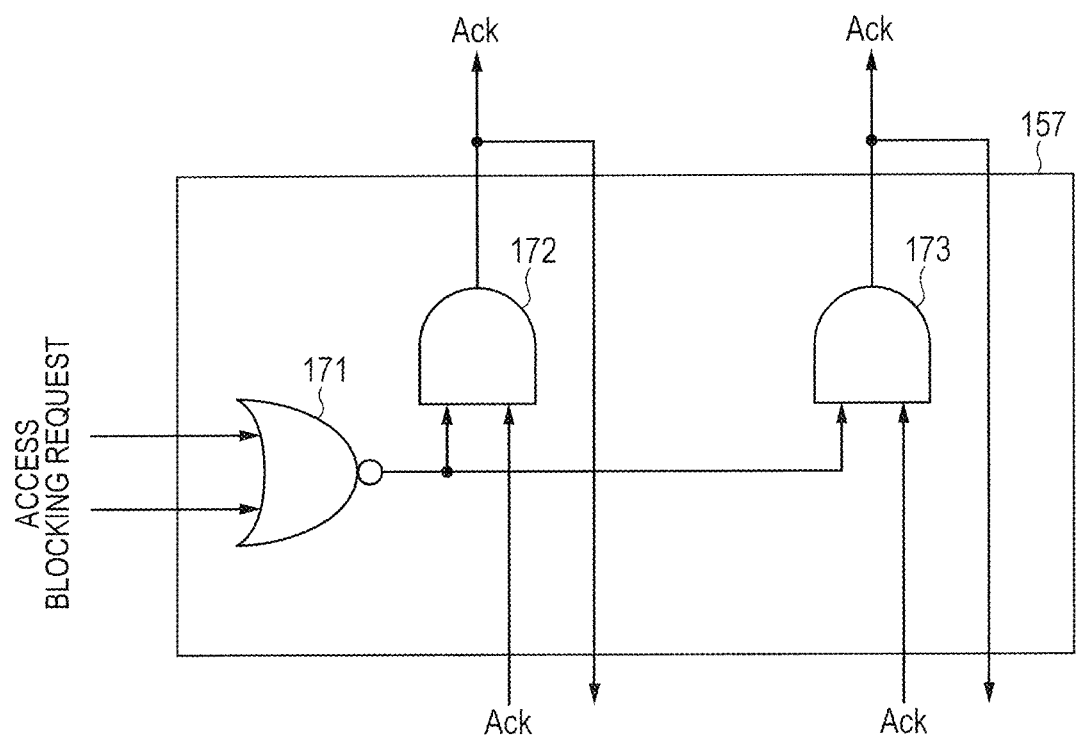
FIG. 7 is a block diagram illustrating an example configuration of an access blocking circuit.

FIG. 7 illustrates an example configuration of the access blocking circuit 157. The access block circuit 157 includes a NOR circuit 171, an AND circuit 172, and an AND circuit 173. Acknowledgement signal Ack output from the arbiter section 151 is assumed to maintain the H level until access request signal Req (see FIG. 3 and the like) is negated at the L level. The NOR circuit 171 is supplied with access blocking request signals transmitted from the register section A 153 and the register section B 154. The NOR circuit 171 outputs negative OR between the access blocking request signals transmitted from the register section A 153 and the register section B 154. The NOR circuit 171 outputs an L level signal when at least one of the access blocking request signals is set to the H level. The NOR circuit 171 outputs an H level signal when both access blocking request signals are set to the L level.

The AND circuit 172 outputs logical AND between acknowledgement signal Ack output from the arbiter section 151 to the module A 103 and an output from the NOR circuit 171. An output from the AND circuit 172 is transmitted as acknowledgement signal Ack to the module A 103. When the output from the NOR circuit 171 is set to the L level, the AND circuit 172 blocks acknowledgement signal Ack output from the arbiter section 151 to the module A 103. When the output from the NOR circuit 171 is set to the H level, the AND circuit 172 allows passing of acknowledgement signal Ack output from the arbiter section 151 to the module A 103.

The output from the AND circuit 172 is returned to the arbiter section 151. The arbiter section 151 references acknowledgement signal Ack returned from the AND circuit 172 and thereby recognizes that acknowledgement signal Ack passes through the access block circuit 157 and is transmitted to the module A 103. The arbiter section 151 outputs acknowledgement signal Ack to the module A 103 and then sets selection signal SEL to "b01" when recognizing that acknowledgement signal Ack passes through the access block circuit 157 and is transmitted to the module A 103.

The AND circuit 173 outputs logical AND between an output from the NOR circuit 171 and acknowledgement signal Ack output from the arbiter section 151 to the module B 104. The output from the AND circuit 173 is transmitted as acknowledgement signal Ack to the module B 104. When the output from the NOR circuit 171 is set to the L level, the AND circuit 173 blocks acknowledgement signal Ack output from the arbiter section 151 to the module B 104. When the output from the NOR circuit 171 is set to the H level, the AND circuit 173 allows passing of acknowledgement signal Ack output from the arbiter section 151 to the module B 104.

The output from the AND circuit 173 is returned to the arbiter section 151. The arbiter section 151 references acknowledgement signal Ack returned from the AND circuit 173 and thereby recognizes that acknowledgement signal Ack passes through the access block circuit 157 and is transmitted to the module A 103. The arbiter section 151 outputs acknowledgement signal Ack to the module B 104 and then sets selection signal SEL to "b10" when recognizing that acknowledgement signal Ack passes through the access block circuit 157 and is transmitted to the module B 104.

Operation when No Access is Blocked

Figure 8:
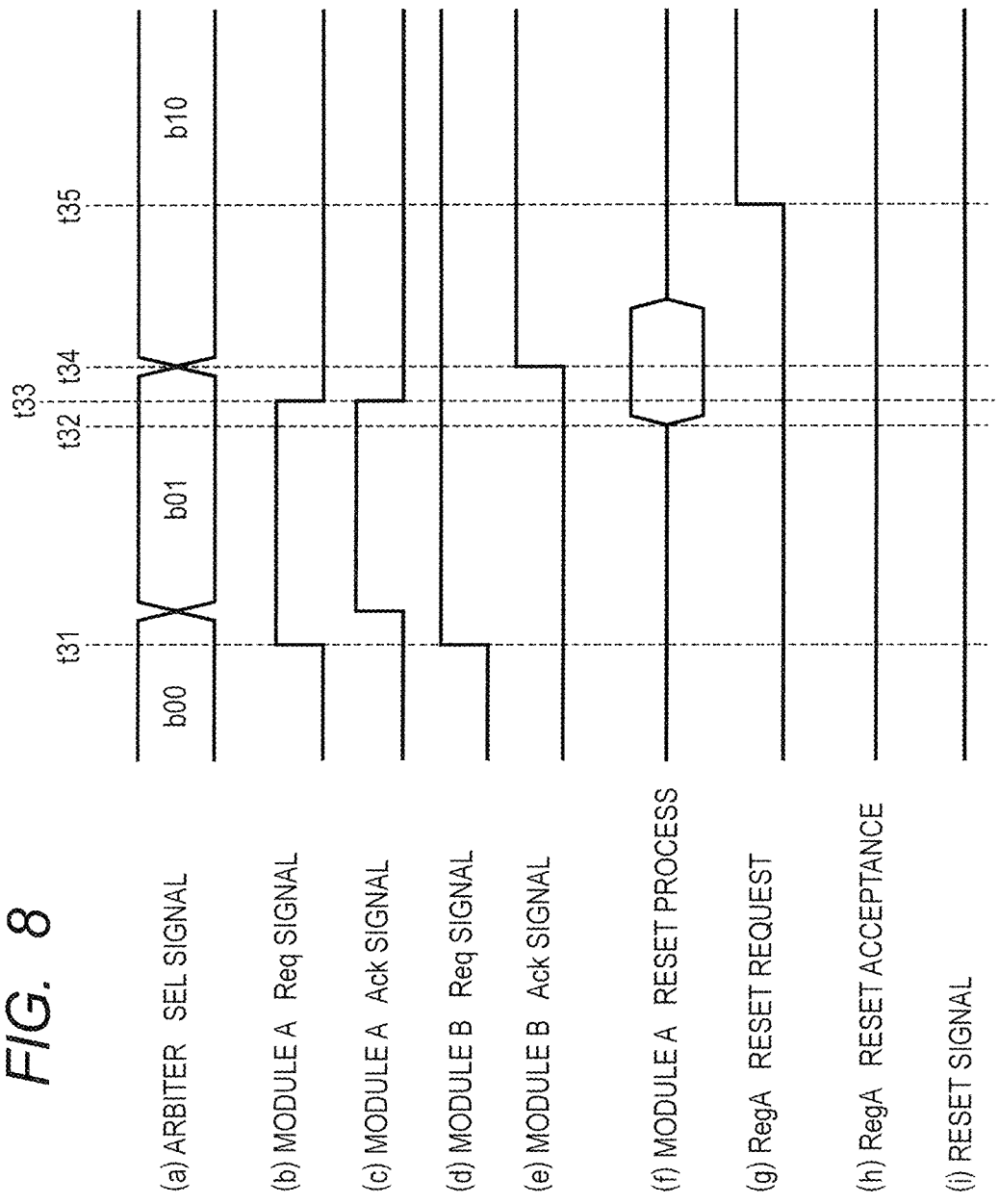
FIG. 8 is a timing chart illustrating operation waveforms of respective sections when an acknowledgement signal is not blocked.

The description below explains possible issues that may occur when the access block circuit 157 is not used. FIG. 8 illustrates operation waveforms of respective sections when no access blocking request signal is transmitted to the access block circuit 157. With reference to FIG. 8, the description below explains possible issues that may occur when the CPU A 101 and the CPU B 102 issue reset requests to the module A 103 and the module B 104 as secondary arithmetic processing units and to the signal processing circuit 105*a*, the system does not concern the respective reset processes, and no access blocking request signal is transmitted to the access block circuit 157.

Suppose neither module starts the signal processing circuit 105*a* and the arbiter section 151 transmits selection signal SEL set to "b00" (see (a)). The module A 103 is started by the CPU A 101 and transmits access request signal Req to the signal processing circuit 105*a* at time t31 (see (b)). The module B 104 is started by the CPU B 102 and transmits access request signal Req to the signal processing circuit 105*a* at time t31 (see (d)).

The arbiter section 151 arbitrates the access requests, selects the module A 103 and transmits acknowledgement signal Ack to the selected module A 103 (see (c)). At this time, the arbiter section 151 transmits selection signal SEL set to "b01" to the reset control section 155 and the selector 156 (see (a)). The module A 103 receives acknowledgement signal Ack, identifies selection of its own, and starts an arithmetic process.

The CPU A 101 determines to reset the module A 103 due to a certain cause and then instructs the module A 103 to perform the reset process via the slave bus 107. The module A 103 receives the instruction and starts the reset process on itself at time t32 (see (f)). The CPU A 101 sets a reset request to the register section A 153 of the signal processing circuit 105a via the slave bus 107 in parallel with the reset on the module A 103. At this time, suppose the reset request is belatedly set to the register section A 153 because the slave bus 107 is congested, for example.

At time t33, the module A 103 negates access request signal Req transmitted to the signal processing circuit 105a at the L level in accordance with the reset process (see (b)). No reset request may be set to the register section A 153 at the time t33. In such a case, the arbiter section 151 redoes the arbitration to select the module B 104 based on the negation of access request signal Req received from the module A 103.

When selecting the module B 104, the arbiter section 151 transmits acknowledgement signal Ack to the module B 104 at time t34 (see (e)). The arbiter section 151 transmits selection signal SEL set to "b10" to the reset control section 155 and the selector 156 (see (a)). When receiving acknowledgement signal Ack, the module B 104 identifies selection of its own, and starts an arithmetic process.

The reset request is later set to the register section A 153 at time t35. The register section A 153 then transmits a reset request signal to the reset control section 155 (see (g)). However, the arbiter section 151 transmits selection signal SEL set to "b10" to the reset control section 155. At time t35, the reset control section 155 therefore transmits neither reset signal Reset nor a reset acceptance signal (see (h) and (i)). The reset process does not start.

As above, the reset request may be belatedly set to the signal processing circuit 105a. In such a case, the other module is likely to access the signal processing circuit 105a before the signal processing circuit 105a is reset. The arithmetic process on the module B 104 may be hindered if information incompletely processed for the module A 103 remains in the signal processing circuit 105a at time t34.

Example Operation when Access is Blocked

Figure 9:
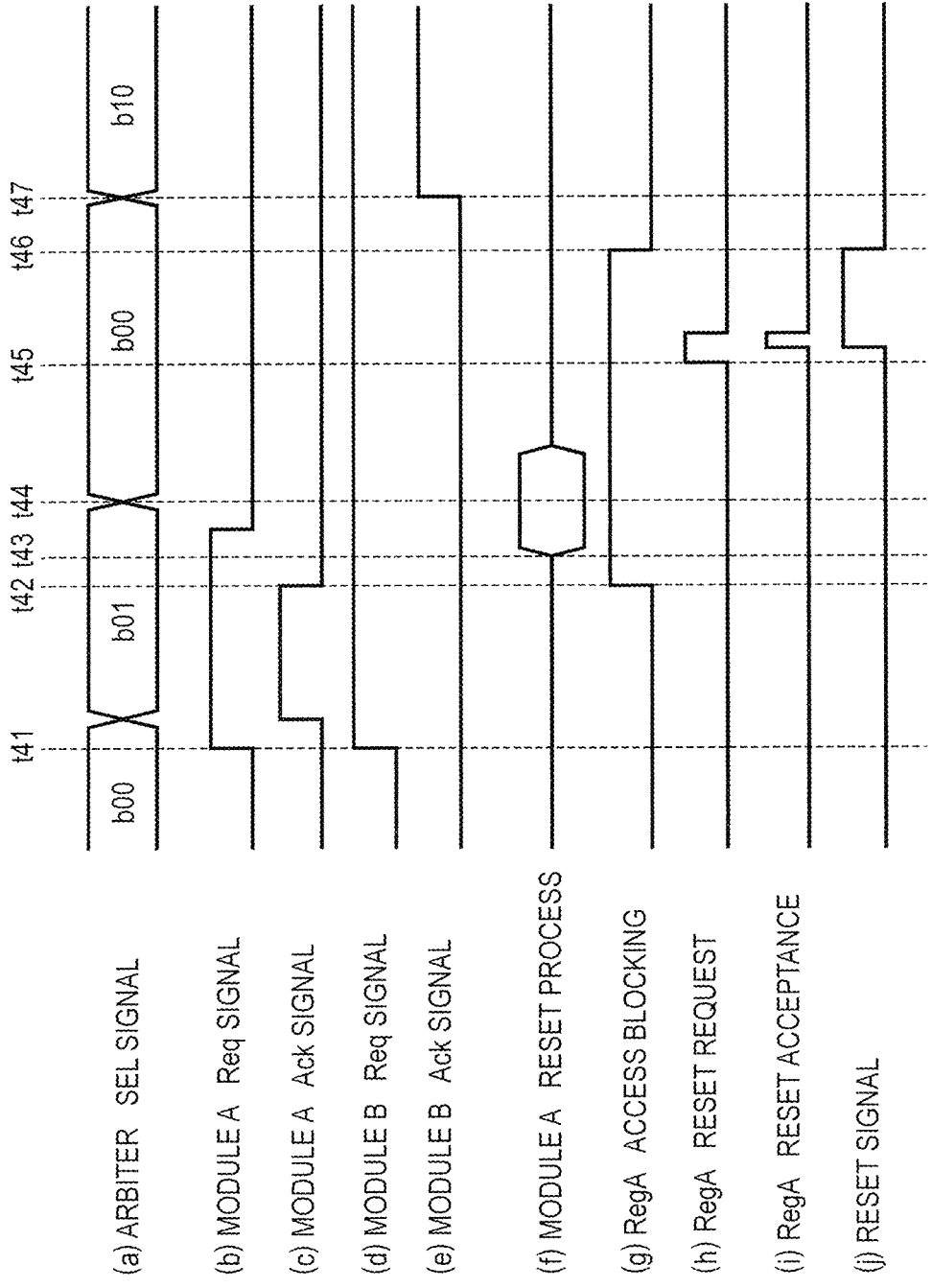
FIG. 9 is a timing chart illustrating operation waveforms of respective sections when an acknowledgement signal is blocked.

FIG. 9 illustrates operation waveforms of respective sections when the access block circuit 157 blocks acknowledgement signal Ack. Suppose neither module starts the signal processing circuit 105a and the arbiter section 151 transmits selection signal SEL set to "b00" (see (a)). The module A 103 is started by the CPU A 101 and transmits access request signal Req to the signal processing circuit 105a at time t41 (see (b)). The module B 104 is started by the CPU B 102 and transmits access request signal Req to the signal processing circuit 105a at time t41 (see (d)).

The arbiter section 151 arbitrates the access requests, selects the module A 103 and transmits acknowledgement signal Ack to the selected module A 103 (see (c)). At this time, the arbiter section 151 transmits selection signal SEL set to "b01" to the reset control section 155 and the selector 156 (see (a)). The module A 103 receives acknowledgement signal Ack, identifies selection of its own, and starts an arithmetic process.

The CPU A 101 determines to reset the module A 103 due to a certain cause and then sets an access blocking request to the register section A 153 via the slave bus 107 at time t42. When the access blocking request is set, the register section A 153 transmits an access blocking request signal to the access block circuit 157 (see (g)). When receiving the access blocking request signal, the access block circuit 157 blocks acknowledgement signal Ack output to the module A 103 from the arbiter section 151 (see (c)). The module A 103 already starts the arithmetic process and therefore continues performing performs the arithmetic process even if acknowledgement signal Ack is blocked (negated at the L level).

When successfully setting the access blocking request, the CPU A 101 instructs the module A 103 to perform the reset process via the slave bus 107. The module A 103 receives the instruction and starts the reset process on itself at time t43 (see (f)). The CPU A 101 sets a reset request to the register section A 153 of the signal processing circuit 105a via the slave bus 107 in parallel with the reset on the module A 103. At this time, suppose the reset request is belatedly set to the register section A 153 because the slave bus 107 is congested similarly to the example in FIG. 8, for example.

The module A 103 negates access request signal Req transmitted to the signal processing circuit 105a at the L level in accordance with the reset process (see (b)). The arbiter section 151 redoes the arbitration to select the module B 104 based on the negation of access request signal Req transmitted from the module A 103. When selecting the module B 104, the arbiter section 151 transmits acknowledgement signal Ack to the module B 104 at time t44. However, this acknowledgement signal Ack is blocked by the access block circuit 157 and is not transmitted to the module B 104. The arbiter section 151 transmits selection signal SEL set to "b00" to the reset control section 155 and the selector 156 at time t44 (see (a)) because acknowledgement signal Ack is not transmitted to the module B 104.

The reset request is later set to the register section A 153 at time t45. The register section A 153 then transmits a reset request signal to the reset control section 155 (see (h)). At time t45, the arbiter section 151 transmits selection signal SEL set to "b00" (see (a)). In this case, the reset control section 155 transmits the reset acceptance signal to the register section A 153 (see (i)) and transmits reset signal Reset to the arbiter section 151 and the signal processing section 152 (see (j)). When receiving the reset acceptance signal, the register section A 153 resets its own necessary portion and negates the reset request signal at the L level.

At time t46, the reset control section 155 negates reset signal Reset at the L level (see (j)). At this time, the register section A 153 negates the access blocking request signal to be transmitted to the access block circuit 157 at the L level (see (g)). When the access blocking request signal is negated at the L level, the access block circuit 157 transmits acknowledgement signal Ack to the module B 104 (see (e)). At time t47, the arbiter section 151 transmits selection signal SEL set to "b10" to the reset control section 155 and the selector 156 (see (a)), for example. The module B 104 receives acknowledgement signal Ack, identifies selection of its own, and starts an arithmetic process.

Overview

According to the embodiment, the signal processing circuit 105a includes the access block circuit 157. The CPU A 101 and the CPU B 102 provide the signal processing circuit 105a with an access blocking request when performing the reset process on the module A 103 and the module B 104. When the access blocking request is enabled, the access block circuit 157 blocks acknowledgement signal Ack output from the arbiter section 151 before access to the module A 103 and the module B 104. The use of the access block circuit 157 can prevent the other module from starting the arithmetic process until the reset process is completed even if the reset timing and the start timing vary due to an external cause such as a bus load on the slave bus 107.

Third Embodiment

Figure 10:
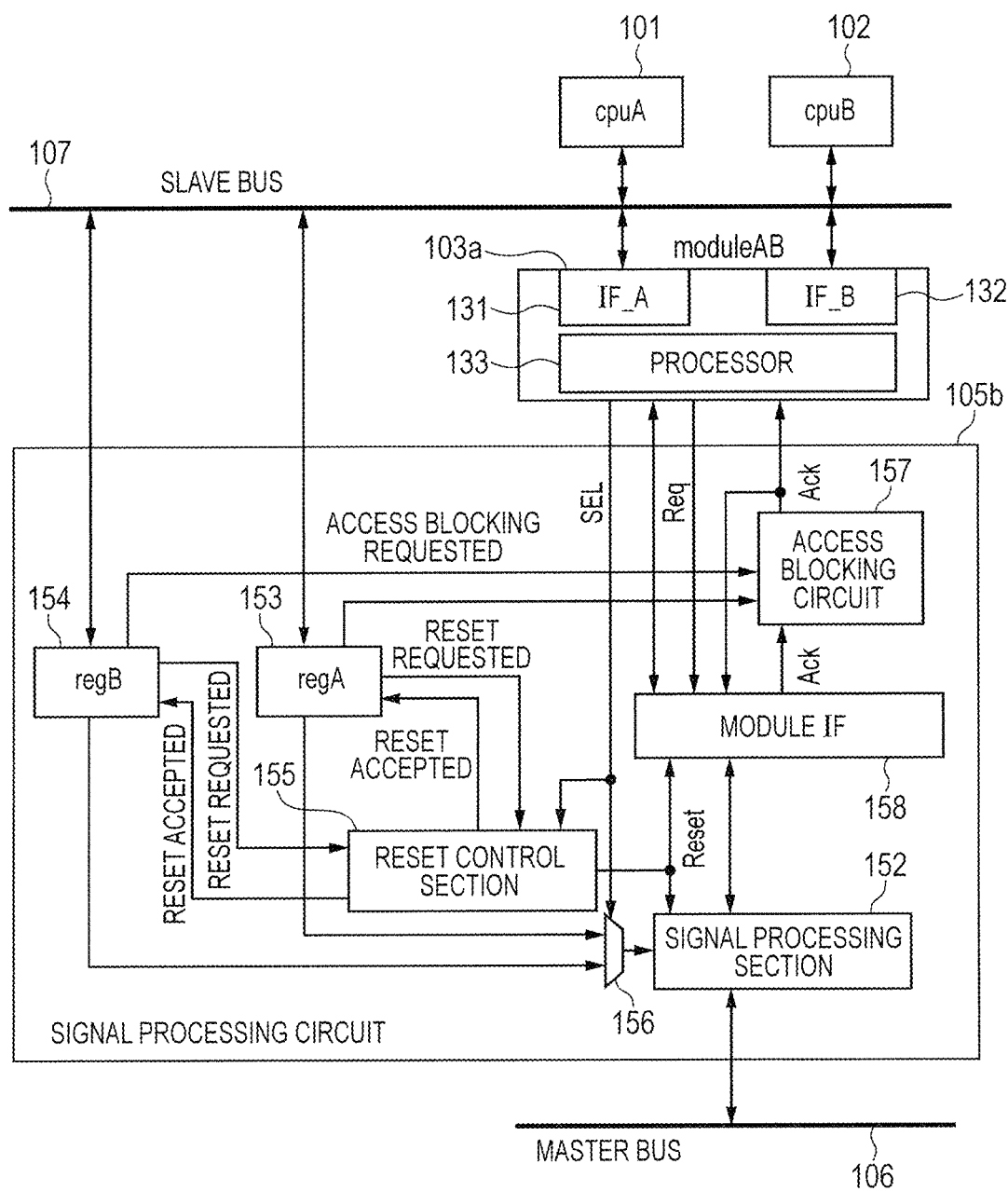
FIG. 10 is a block diagram illustrating a signal processing system according to a third embodiment.

A third embodiment will be described. FIG. 10 illustrates the signal processing system according to the third embodiment. A signal processing system 100b according to the third embodiment mainly differs from the signal processing system 100a in FIG. 6 according to the second embodiment in that a module AB 103a shared by the CPU A 101 and the CPU B 102 is used as a secondary arithmetic processing unit. Otherwise, the signal processing system 100b may be comparable to the second embodiment.

The signal processing system 100b according to the embodiment allows the module AB 103a to be controlled by a plurality of CPUs. The module AB 103a includes an interface A 131, an interface B 132, and a processor 133. The interface A 131 communicates with the CPU A 101 via the slave bus 107. The interface A 131 includes a register that accepts settings transmitted from the CPU A 101. The interface B 132 communicates with the CPU B 102 via the slave bus 107. The interface B 132 includes a register and the like that accept settings transmitted from the CPU B 102. The processor 133 is provided in common with the CPU A 101 or the CPU B 102 and is controlled by these CPUs to perform an arithmetic process.

The signal processing circuit 105b used for the embodiment includes a module IF (interface) 158 in place of the arbiter section 151 (see FIG. 6 and the like) included in the signal processing circuit 105a used for the second embodiment. The module IF 158 receives access request signal Req from the module AB 103a. When receiving access request signal Req, the module IF 158 transmits acknowledgement signal Ack to the module AB 103a via the access block circuit 157. The module AB 103a corresponds to the image processor 16 in FIG. 1, for example. The signal processing circuit 105b corresponds to the data compressor-decompressor 17, for example.

According to the embodiment, the module AB 103a includes a function comparable to the arbitration performed by the arbiter section 151. The CPU A 101 sets an initial setup value to the module AB 103a via the slave bus 107 and starts the module AB 103a. Similarly, the CPU B 102 sets an initial setup value to the module AB 103a via the slave bus 107 and starts the module AB 103a. The module AB 103a receives acknowledgement signal Ack from the signal processing circuit 105b and then transmits selection signal SEL to the reset control section 155 and the selector 156 of the signal processing circuit 105b on condition that selection signal SEL indicates which CPU started the arithmetic process performed on the processor 133.

The module AB 103a performs a reset process when the CPU A 101 or the CPU B 102 as an origin of controlling the processor 133 issues a reset request. For example, suppose the module AB 103a is started by the CPU A 101 and performs an arithmetic process, for example. In such a case, the module AB 103a performs a reset process when the CPU A 101 issues a reset request. The module AB 103a does not perform a reset process even if the CPU B 102 issues a reset request while the module AB 103a is started by the CPU A 101 and performs the arithmetic process. The reset control in the module AB 103a may be comparable to that described in patent literature 1.

Example Operation During Reset Operation

The description below explains example operations during reset operation according to the embodiment. For example, the CPU A 101 provides a start bit to the interface A 131 of the module AB 103a to start the module AB 103a. The CPU B 102 provides a start bit to the interface B 132 of the module AB 103a to start the module AB 103a. The module AB 103a performs the arbitration, selects the CPU A 101 as a control origin, for example, and starts an arithmetic process in the processor 133. The module AB 103a transmits access request signal Req to the signal processing circuit 105b, receives acknowledgement signal Ack, and starts an access to the signal processing circuit 105b. At this time, module AB 103a transmits selection signal SEL set to "b01" to the signal processing circuit 105b. Under this situation, suppose the CPU A 101 issues a reset request as follows.

Before issuing a reset request, the CPU A 101 sets an access blocking request to the register section A 153 via the slave bus 107. The register section A 153 transmits an access blocking request signal to the access block circuit 157. The access block circuit 157 subsequently blocks acknowledgement signal Ack targeted at the module AB 103a.

The CPU A 101 instructs the module AB 103a to perform a reset process via the slave bus 107. The module AB 103a receives the instruction and starts the reset process including resets on the interface A 131 and the processor 133. The CPU A 101 sets a reset request to the register section A 153 via the slave bus 107 in parallel with the reset by the module AB 103a.

When the reset request is set to the register section A 153, the register section A 153 transmits a reset request signal to the reset control section 155. When receiving selection signal SEL not set to "b10" from the module AB 103a, the reset control section 155 transmits a reset acceptance signal to the register section A 153 and transmits reset signal Reset to the arbiter section 151 and the signal processing section 152. In this manner, the signal processing circuit 105b performs the reset process.

The module AB 103a nullifies the start bit for the interface A 131 during the reset process and redoes the arbitration in parallel with the reset process on the signal processing circuit 105b. The module AB 103a selects the CPU B 102 as a control origin of the arithmetic process in the processor 133 because the start bit is set for the interface B 132. The module AB 103a transmits access request signal Req to the signal processing circuit 105b. The module IF 158 outputs acknowledgement signal Ack as a response to the access request signal Req. At this time, the access block circuit 157 may receive the access blocking request signal. In such a case, the access block circuit 157 blocks the acknowledgement signal output from the module IF 158.

When the reset terminates, the reset control section 155 negates reset signal Reset at the L level. The register section A 153 negates the access blocking request signal transmitted to the access block circuit 157 at the L level. When the access blocking request signal is negated, the access block circuit 157 transmits acknowledgement signal Ack to the module AB 103a. When receiving acknowledgement signal Ack, the module AB 103a transmits selection signal SEL set to "b10" to the reset control section 155 and the selector 156 and starts accessing the signal processing circuit 105b.

Suppose the access block circuit 157 does not receive the access blocking request signal. In such a case, acknowledgement signal Ack output from the module IF 158 is transmitted to the module AB 103a without being blocked by the access block circuit 157. In this case, the reset request may be belatedly set to the register section A 153 because the slave bus 107 is congested similarly to the example in FIG. 8, for example. The module AB 103a is then likely to receive acknowledgement signal Ack before the signal processing circuit 105b starts the reset process. The module AB 103a receives acknowledgement signal Ack and then outputs selection signal SEL set to "b10." The signal processing circuit 105b therefore does not perform the reset process even if the CPU A 101 subsequently sets the reset request. In this case, the module AB 103a started by the CPU B 102 accesses the signal processing circuit 105b where no reset process is performed. Setting the access blocking request before the reset can avoid this issue.

Overview

According to the embodiment, the CPU A 101 and the CPU B 102 control the module AB 103a. The module AB 103a outputs selection signal SEL to the reset control section 155 and the selector 156 so that selection signal SEL is used as information (control origin identification information) to identify the CPU as an origin of controlling the arithmetic process performed on the module AB 103a. The reset control section 155 controls execution of the reset process based on selection signal SEL transmitted from the module AB 103a and the reset request signal transmitted from the register section A 153 or the register section B 154. Similarly to the first embodiment, the CPU A 101 and the CPU B 102 can thereby reset the signal processing circuit 105b without hindering the arithmetic process started by a CPU different from the CPU A 101 and the CPU B 102.

According to the embodiment, the signal processing circuit 105b includes the access block circuit 157 between the module AB 103a and the module IF 158. The CPU A 101 and the CPU B 102 provide the signal processing circuit 105b with an access blocking request when performing the reset process on the module AB 103a. Similarly to the second embodiment, it is therefore possible to prevent the arithmetic process activated by the other CPU from starting until the reset process is completed even if the reset timing and the start timing vary due to an external cause such as a bus load on the slave bus 107.

First Modification

A first modification will be described. The signal processing system according to the first modification is configured similarly to the signal processing system 100a in FIG. 6 according to the second embodiment, for example. The signal processing system first modification may be configured similarly to the signal processing system 100 in FIG. 2 according to the first embodiment or may be configured similarly to the signal processing system 100b in FIG. 10 according to the third embodiment.

Selection signal SEL (control origin identification signal) received from the arbiter section 151 may indicate a module different from the module under control of the CPU that sets the reset request. In such a case, the signal processing system according to the first modification allows the reset control section 155 to reset part of the signal processing circuit 105a dedicated to the CPU. In other words, the reset control section 155 resets part of the signal processing circuit 105a dedicated to the CPU when the signal processing section 152 performs a process started by a module controlled by a CPU different from the module controlled by the CPU that sets the reset request.

For example, consider the CPU A 101 issues a reset request to the module A 103 and the signal processing circuit 105a in a situation where the module A 103 and the module B 104 are each started from the corresponding CPU and the module B 104 is selected in the signal processing circuit 105a to perform a process on the module B 104. In this case, the signal processing circuit 105a resets a dedicated part of the CPU A 101 (module A 103), for example, only the register section A 153 without awaiting termination of the process on the module B 104.

Operational Procedure According to the First Modification

Figure 11:
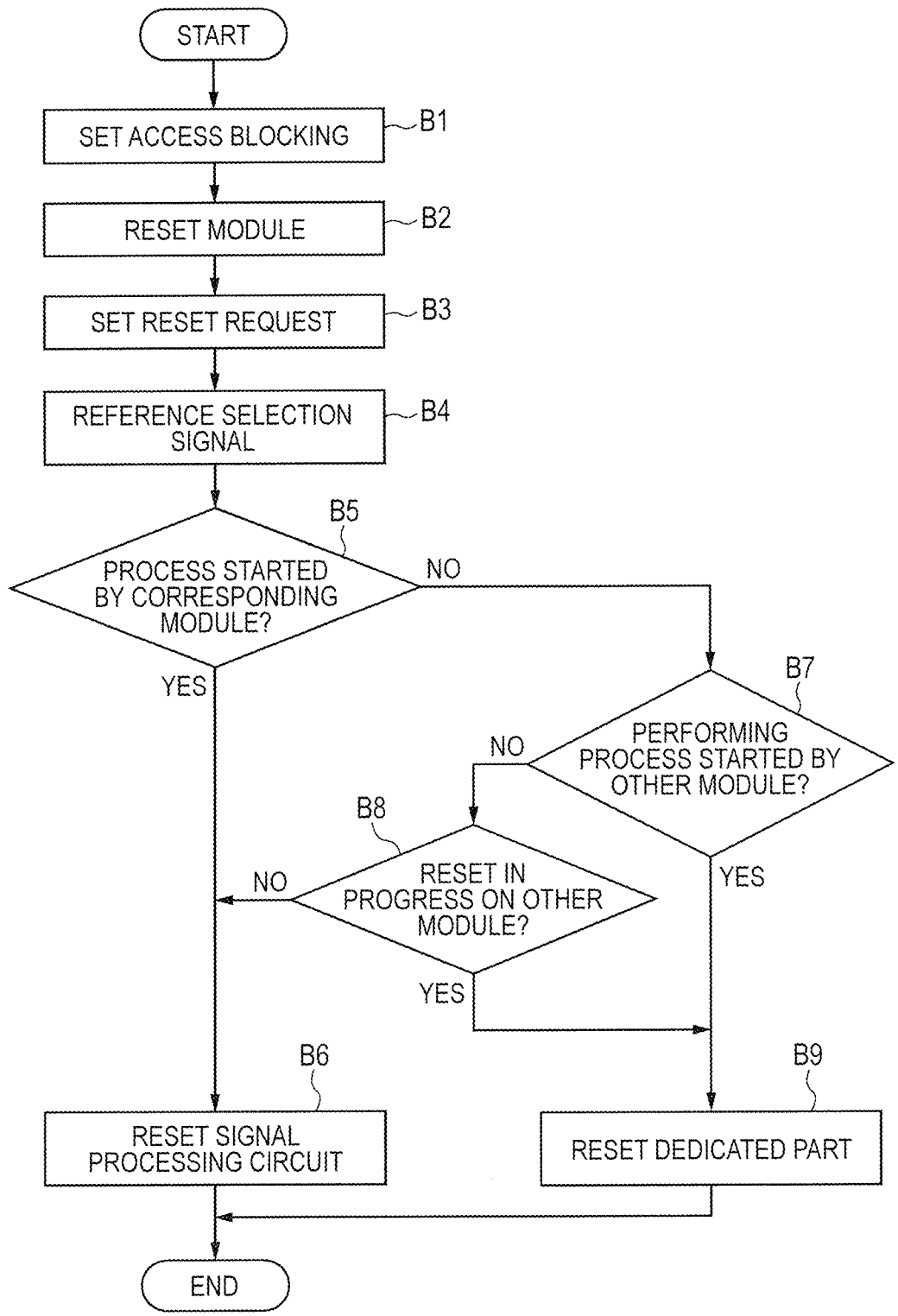
FIG. 11 is a flowchart illustrating an operational procedure during reset operation in the signal processing system according to a first modification.

FIG. 11 illustrates an operational procedure during reset operation according to the first modification. The description below explains examples where the CPU A 101 resets the module A 103 and the signal processing circuit 105a. The same applies to an operational procedure in which the CPU B 102 resets the module B 104 and the signal processing circuit 105a.

The CPU A 101 determines to reset the module A 103 due to a certain cause. Before the reset, the CPU A 101 sets an access blocking request to the register section A 153 (step B1). When the access blocking request is set, the register section A 153 returns an access blocking request signal to the access block circuit 157. The access block circuit 157 blocks acknowledgement signal Ack output to the module A 103 and the module B 104 while the access blocking request signal is asserted.

The CPU A 101 instructs the module A 103 to perform the reset process via the slave bus 107 (step B2). The module A 103 receives the instruction and starts the reset process on itself. The CPU A 101 sets a reset request to the register section A 153 of the signal processing circuit 105a via the slave bus 107 in parallel with the reset on the module A 103 (step B3). When the reset request is set, the register section A 153 transmits a reset request signal to the reset control section 155.

When receiving the reset request signal, the reset control section 155 references selection signal SEL transmitted from the arbiter section 151 (step B4). Based on selection signal SEL, the reset control section 155 determines whether the corresponding module starts a signal process on the signal processing section 152 (step B5). The reset control section 155 determines that the module A 103 corresponding to the CPU A 101 having issued the reset request starts the process if selection signal SEL is set to "b01" at B5, for example.

At B5, the reset control section 155 may determine that the corresponding module starts the signal process on the signal processing section 152. In this case, the reset control section 155 resets the arbiter section 151, the signal processing section 152, and the register section A 153 of the signal processing circuit 105a (B6). At B6, in more detail, the reset control section 155 transmits reset signal Reset to the arbiter section 151 and the signal processing section 152 to reset the arbiter section 151 and the signal processing section 152. The reset control section 155 transmits a reset acceptance signal to the register section A 153 to reset the register section A 153.

At B5, the reset control section 155 may determine that the corresponding module does not start the signal process on the signal processing section 152. In this case, the reset control section 155 determines whether the signal processing section 152 performs a process started by the other module (B7). At B7, the reset control section 155 determines that a process started by the other module is performed if selection signal SEL is set to "b10," for example. In this case, the signal processing circuit 105a does not start a process on the module A 103 started by the CPU A 101. Even resetting the dedicated part of the module A 103 (CPU A 101) does not affect the process performed on the module B 104. At B7, the reset control section 155 may determine that a process started by the other module is performed. In this case, the reset control section 155 transmits a reset acceptance signal to the register section A 153 to reset the dedicated part (B9). When receiving the reset acceptance signal, the register section A 153 resets its own necessary portion. At this time, the reset control section 155 does not transmit reset signal Reset to the arbiter section 151 and the signal processing section 152.

At B7, it may be determined that a process started by the other module is not performed. The reset control section 155 then determines whether the reset is in progress on the other module, namely, the module B 104 in this case (B8). The process on the module A 103 does not start yet when the module B 104 is being reset similarly to the process being performed on the module B 104. It just needs to reset the part dedicated to the module A 103 (CPU A 101) in the signal processing circuit 105*a*. At B8, it may be determined that the reset is in progress on the other module. The reset control section 155 then proceeds to B9 and transmits a reset acceptance signal to the register section A 153 to reset the dedicated part.

At B8, it may be determined that the reset is not in progress on the other module. This signifies that the signal processing circuit 105*a* does not perform a process on the module A 103 or a process on the module B 104. It is likely that the reset process on the module A 103 is already completed and request signal Req is negated due to an effect of the congested slave bus 107, and a reset request is thereafter set to the register section A 153 and the arbiter section 151 selects neither module (see time t45 in FIG. 9). In this case, it is likely that the module A 103 is reset in the middle of the arithmetic process and the signal processing circuit 105*a* maintains the information incompletely processed by the process activated by the module A 103. The reset control section 155 therefore proceeds to B6 and resets the arbiter section 151, the signal processing section 152, and the register section A 153 even if it is determined at B8 that the reset is not in progress on the other module.

Overview

According to the first modification, the reset control section 155 accepts a reset request from one CPU and the signal processing circuit 105*a* then resets a part dedicated to the CPU. It is therefore possible to perform the reset and shorten the reset process time without awaiting termination of a process performed on the module controlled by the other CPU in the signal processing circuit 105*a*.

Second Modification

Figure 12:
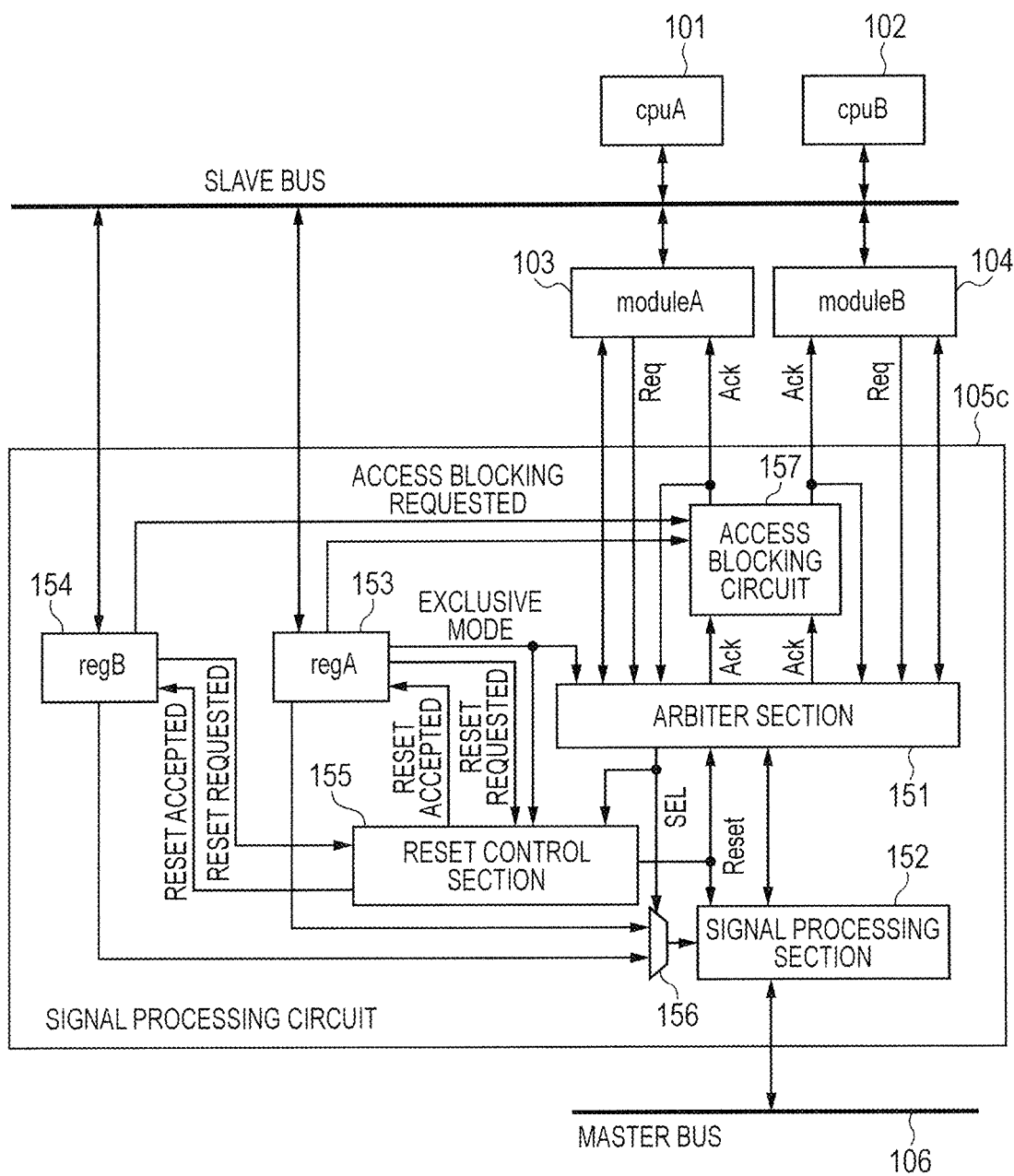
FIG. 12 is a block diagram illustrating a signal processing system according to a second modification.

A second modification will be described. According to the modification, at least one of a plurality of CPUs is configured to be capable of setting a mode (exclusive mode) that enables a module (secondary arithmetic processing unit) controlled by the CPU to exclusively use the signal processing circuit. FIG. 12 illustrates the signal processing system according to the second modification. A signal processing system 100*c* according to the modification mainly differs from the signal processing system 100*a* in FIG. 6 according to the second embodiment in that the register section A 153 is also used as an exclusive mode acceptance section and transmits an exclusive mode signal to the arbiter section 151 and the reset control section 155. Otherwise, the signal processing system 100*c* may be comparable to the first embodiment, the second embodiment, the third embodiment, or the first modification. FIG. 12 illustrates an example of using the register section A 153 as the exclusive mode acceptance section. In place of or in addition to this, the register section B 154 may be used as the exclusive mode acceptance section.

According to the modification, the register section A 153 included in a signal processing circuit 105*c* includes an exclusive mode register that accepts an exclusive mode setting from the CPU A 101. When the exclusive mode is set, the CPU A 101 writes a value to the register section A 153 via the slave bus 107 so that the value indicates an event of setting the exclusive mode. The register section A 153 accepts the exclusive mode setting from the CPU A 101 and then transmits an exclusive mode signal to the arbiter section 151 and the reset control section 155.

The arbiter section 151 receives the exclusive mode signal and then designates the module A 103 to activate the signal processing section 152 of the signal processing circuit 105*c* during the subsequent arbitration because the module A 103 is controlled by the semiconductor apparatus 10 having performed the exclusive mode setting. In other words, while receiving the exclusive mode signal, the arbiter section 151 receives access request signal Req from the module A 103 and transmits acknowledgement signal Ack to the module A 103 but does not transmit acknowledgement signal Ack to the module B 104 even if receiving access request signal Req from the module B 104.

The arbiter section 151 is likely to select the module B 104 at the time of receiving the exclusive mode signal. When receiving the reset request signal from the register section A 153, the reset control section 155 references selection signal SEL transmitted by the arbiter section 151 to perform the reset process similarly to the second embodiment. When receiving the reset request signal from the register section B 154, the reset control section 155 similarly references selection signal SEL transmitted by the arbiter section 151 to perform the reset process.

After the CPU A 101 sets the exclusive mode, the modification can reset the signal processing circuit 105*c* without hindering the process on the module B 104 even if the reset request is set to the register section A 153 at any time. The reason follows. The arbiter section 151 may select the module B 104 at the time of setting the exclusive mode. Nevertheless, the reset control section 155 does not perform the reset process while the module B 104 is selected even when the CPU A 101 issues a reset request. The arbiter section 151 does not select the module B 104 while receiving the exclusive mode signal once the module A 103 is selected in the arbiter section 151.

As above, according to the modification, the CPU A 101 can issue a reset request to the module A 103 and the signal processing circuit 105*c* without providing an access blocking request after the exclusive mode is set for the register section A 153. The CPU B 102 sets an access blocking request to the register section B 154 and then issues a reset request to the module B 104 and the signal processing circuit 105*c*. The CPU A 101 sets an access blocking request to the register section A 153 before issuing a reset request also when the CPU A 101 does not set the exclusive mode.

Overview

According to the modification, the CPU having not set the exclusive mode sets an access blocking request before issuing a reset request similarly to the second embodiment. The CPU having set the exclusive mode need not set an access blocking request before issuing a reset request. The modification can therefore simplify the reset process for the CPU having set the exclusive mode to reset the signal processing circuit and shorten the reset process time.

Third Modification

Figure 13:
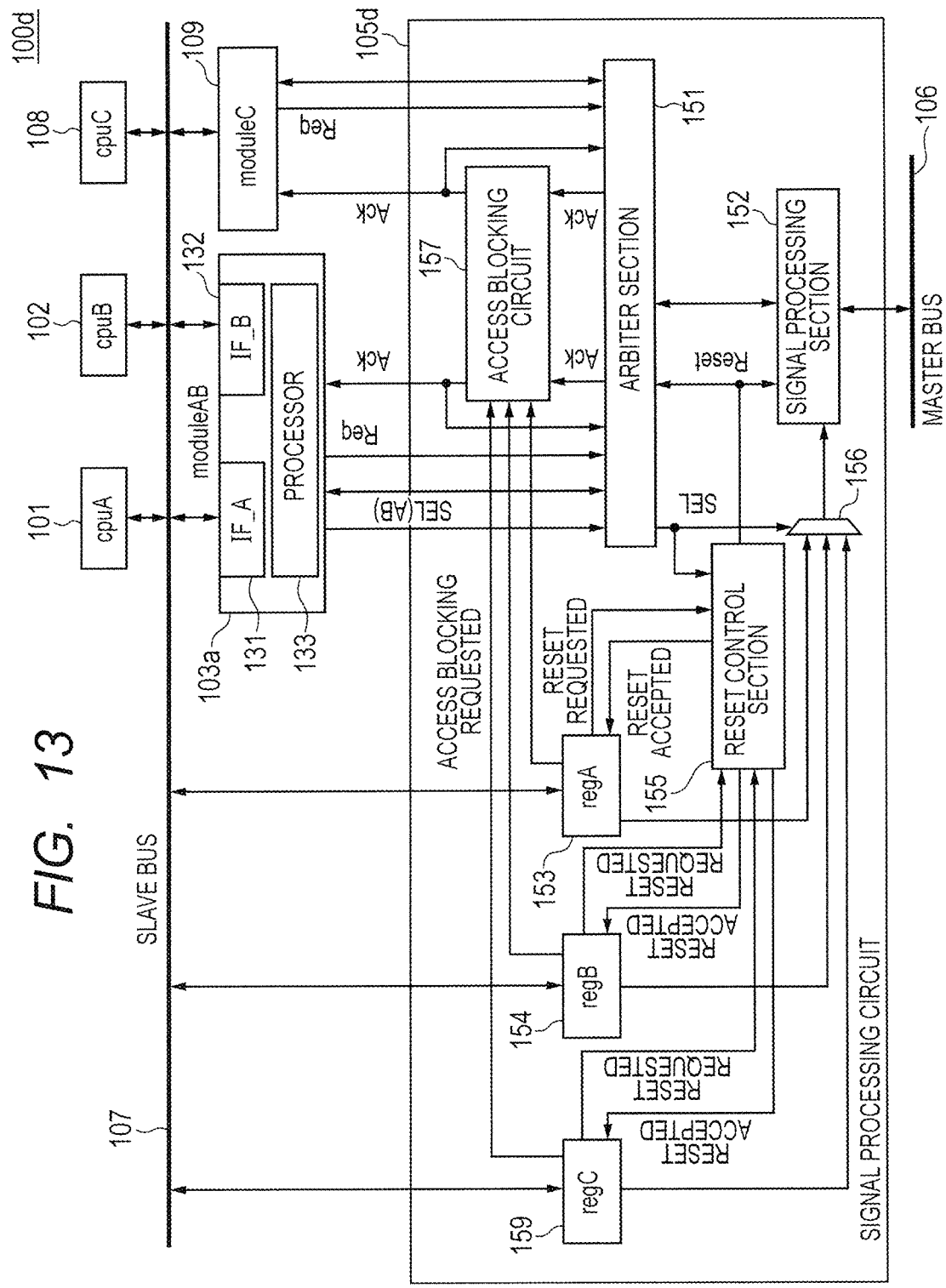
FIG. 13 is a block diagram illustrating a signal processing system according to a third modification.

A third embodiment describes the example where the signal processing system includes the module AB 103*a* (see FIG. 10) controlled by the CPU A 101 and the CPU B 102. In addition, the signal processing system may include a module controlled by a single CPU. FIG. 13 illustrates the signal processing system that includes a module controlled by a plurality of CPUs and a module controlled by a single CPU. A signal processing system 100*d* according to the third modification includes a CPU C 108, a module C (secondary arithmetic processing unit) 109, and a register section C 159 in addition to the configuration of the signal processing system 100*b* illustrated in FIG. 10.

In the signal processing system 100d, a signal processing circuit 105d includes the arbiter section 151. The arbiter section 151 arbitrates between access request signal Req received from the module AB 103a and access request signal Req transmitted from the module C 109 and outputs acknowledgement signal Ack to one of the module A 103a and the module C 109.

The module AB 103a transmits selection signal SEL (AB) to the arbiter section 151 on condition that selection signal SEL (AB) identifies the CPU as an origin of controlling the module AB 103a. When started by the CPU A 101, for example, the module AB 103a transmits selection signal SEL (AB) set to "b01" to the arbiter section 151. When started by the CPU B 102, the module AB 103a outputs selection signal SEL (AB) set to "b10." The arbiter section 151 generates selection signal SEL to be transmitted to the reset control section 155 and the selector 156 based on the arbitration result of the module AB 103a or the module C 109 and the selection signal SEL (AB).

Figure 14:
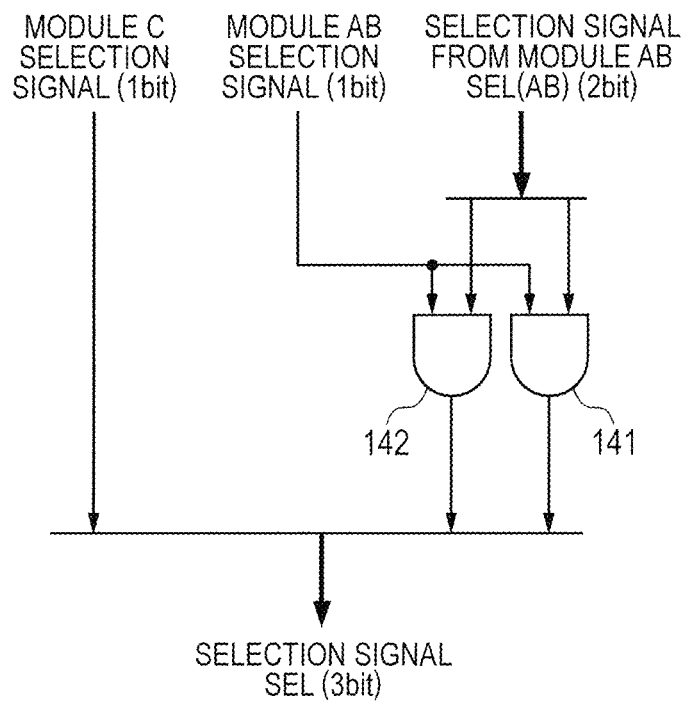
FIG. 14 is a block diagram illustrating an example configuration of a section to generate selection signal SEL according to a third modification.

FIG. 14 illustrates an example configuration of part of the arbiter section 151 to generate selection signal SEL. Select SEL is configured as three bits, for example. Each bit of selection signal SEL corresponds to the CPU A 101, the CPU B 102, and the CPU C 108 (module C 109). The arbiter section 151 generates selection signal AB (one bit) and selection signal C (one bit) as internal signals. Selection signal AB indicates that the module AB 103a is selected. Selection signal C indicates that the module C 109 is selected. The arbiter section 151 sets selection signal AB to "1" and selection signal C to "0" when the module AB 103a is selected. The arbiter section 151 sets selection signal C to "1" and selection signal AB to "0" when the module C 109 is selected.

An AND circuit 141 and an AND circuit 142 each output logical AND between each bit of selection signal SEL (AB) transmitted from the module AB 103a and selection signal AB. The arbiter section 151 combines the output signal from the AND circuit 141, the output signal from the AND circuit 142, and selection signal C to generate 3-bit selection signal SEL. For example, suppose the arbiter section 151 selects module AB 103a and the CPU A 101 is an origin of controlling the module AB 103a. The arbiter section 151 then generates selection signal SEL set to "b001." Suppose the arbiter section 151 selects module AB 103a and the CPU B 102 is an origin of controlling the module AB 103a. The arbiter section 151 then generates selection signal SEL set to "b010." Suppose the arbiter section 151 selects module C 109. The arbiter section 151 then generates selection signal SEL set to "b100." Suppose the arbiter section 151 selects no module. The arbiter section 151 then generates selection signal SEL set to "b000."

The register section C 159 is coupled to the CPU C 108 via the slave bus 107. The register section C 159 stores a setup value used for the signal processing section 152 to perform a signal process started from the module C 109. The register section C 159 is also used as the reset acceptance section to accept a reset request from the CPU C 108. The register section C 159 includes the reset process register that accepts a reset request issued from the CPU C 108 to the signal processing circuit 105d.

When the module C 109 is reset, the CPU C 108 writes a value to the register section C 159 via the slave bus 107 on condition that the value indicates an event of setting the reset request. When accepting the reset request, the register section C 159 transmits a reset request signal to the reset control section 155. The reset control section 155 performs the reset process when the reset request signal is transmitted from the register section C 159 and selection signal SEL is set to "b100" indicating selection of the module C 109 or is set to "b000" indication selection of no module, for example. Operations of the CPU A 101 and the CPU B 102 to set the reset request may be comparable to the third embodiment.

Further Modifications

Figure 15:
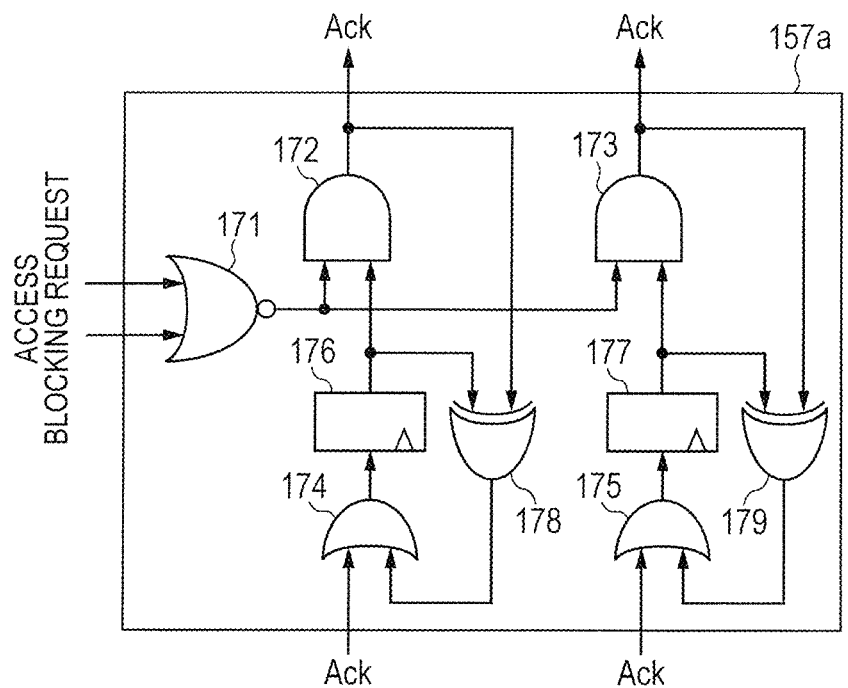
FIG. 15 is a block diagram illustrating another example configuration of the access blocking circuit.

With reference to FIG. 9, for example, the second embodiment describes the example of maintaining acknowledgement signal Ack at the H level while access request signal Req is asserted at the H level. However, the second embodiment may use a one-pulse signal for acknowledgement signal Ack. FIG. 15 illustrates an example configuration of the access block circuit when the acknowledgement uses a one-pulse signal. The an access blocking circuit 157a includes an OR circuit 174, an OR circuit 175, a flip-flop 176, a flip-flop 177, an XOR circuit 178, and an XOR circuit 179 in addition to the configuration of the access block circuit 157 in FIG. 7.

The OR circuit 174 outputs logical OR between a signal output from the XOR circuit 178 and acknowledge signal Ack output from the arbiter section 151 (see FIG. 6) to the module A 103. The flip-flop (FF) 176 maintains an output from the OR circuit 174. The AND circuit 172 outputs logical AND between an output from the FF 176 and an output from the NOR circuit 171. The XOR circuit 178 outputs exclusive OR between an output from the FF 176 and an output from the AND circuit 172.

The OR circuit 175 outputs logical OR between a signal output from the XOR circuit 179 and acknowledge signal Ack output from the arbiter section 151 to the module B 104. The FF 177 maintains an output from the OR circuit 175. The AND circuit 173 outputs logical AND between an output from the FF 177 and an output from the NOR circuit 171. The XOR circuit 179 outputs exclusive OR between an output from the FF 177 and an output from the AND circuit 173.

The OR circuit 174 outputs an H-level signal when the arbiter section 151 asserts acknowledgement signal Ack to be output to the module A 103. The FF 176 maintains "1" when the output from the OR circuit 174 goes to the H level. The NOR circuit 171 outputs an L-level signal when the register section A 153 transmits an H-level access blocking request signal. The output from the AND circuit 172 does not change to the H level even if the FF 176 outputs "1." That is, acknowledgement signal Ack is not transmitted to the module A 103. The module A 103 waits for the process to start.

The XOR circuit 178 outputs an H-level signal because the FF 176 outputs "1" corresponding to the H level and the output from the AND circuit 172 corresponds to the L level. The access block circuit 157a uses the one-pulse signal for acknowledgement signal Ack. The output from the XOR circuit 178 remains at the H level even if acknowledgement signal Ack is negated at the L level after a predetermined period. The FF 176 therefore continues to maintain "1." In other words, the FF 176 maintains acknowledgement signal Ack output to the module A 103.

The access blocking request signal transmitted from the register section A 153 goes to the L level. The NOR circuit 171 then outputs an H-level signal. The AND circuit 172 outputs an H-level signal. The H-level signal output from the AND circuit 172 is transmitted to the module A 103. In other words, acknowledgement signal Ack transmitted to the module A 103 is asserted at the H level. The module A 103 receives acknowledgement signal Ack and then starts accessing the signal processing circuit 105a.

Changing the output from the AND circuit 172 to the H level forces the H level on both inputs to the XOR circuit 178. The output from the XOR circuit 178 therefore changes to the L level. The output from the OR circuit 174 goes to the L level if acknowledgement signal Ack is already negated at the L level at the time the output from the XOR circuit 178 changes to the L level. In this case, the FF 176 maintains "0" and the output from the AND circuit 172 changes to the L level. The use of the access block circuit 157a according to the configuration illustrated in FIG. 15 can transmit acknowledgement signal Ack to the module A 103 even if acknowledgement signal Ack is provided as a one-pulse signal.

The above also applies to acknowledgement signal Ack transmitted from the arbiter section 151 to the module B 104. The FF 177 maintains acknowledgement signal Ack output to the module B 104 via the OR circuit 175 while the access blocking request signal transmitted from the register section B 154 remains the H level. The access blocking request signal transmitted from the register section B 154 changes to the L level. An output from the AND circuit 173 then changes to the H level. Acknowledgement signal Ack is transmitted to the module B 104. An output from the XOR circuit 179 goes to the L level after acknowledgement signal Ack is transmitted. The acknowledgement signal maintained in the FF 177 is thereby nullified.

While there has been described the specific embodiment of the invention made by the inventors, it is to be distinctly understood that the present invention is not limited to the above-mentioned embodiment and may be embodied in various modifications without departing from the spirit and scope of the invention. For example, the above-mentioned embodiments and modifications are available in any combinations.

What is claimed is:

1. A signal processing system comprising:
    a plurality of central processing units;
    a plurality of secondary arithmetic processing units controlled by the central processing units; and
    a signal processing circuit controlled by the secondary arithmetic processing units,
    wherein the central processing units issue reset requests to the secondary arithmetic processing units, respectively,
    wherein the signal processing circuit includes:
        a process execution section that is started, by a first secondary arithmetic processing unit the secondary arithmetic processing units, to perform a signal process;
    a reset acceptance section that accepts a reset request from one of the central processing units; and
    a reset control section that performs a reset process based on:
        a control origin identification signal that identifies the one of the central processing units as an origin of controlling the first secondary arithmetic processing unit to start the process execution section to perform the signal process; and
        the reset request accepted by the reset acceptance section.

2. The signal processing system according to claim 1, wherein the signal processing circuit further includes an arbitration section, wherein the arbitration section 1) receives access request signals from the secondary arithmetic processing units and 2) selects one of the secondary arithmetic processing units that transmitted one of the access request signals to the arbitration section, and wherein the selected one of the secondary arithmetic processing units is the first secondary arithmetic processing unit that starts the process execution section to perform the signal process.

3. The signal processing system according to claim 2, wherein the central processing units control the secondary arithmetic processing units, respectively, wherein the arbitration section outputs the control origin identification signal to the reset control section, and wherein the control origin identification signal identifies the selected one of the secondary arithmetic processing units as being controlled by the one of the central processing units.

4. The signal processing system according to claim 2, wherein in response to selecting the one of the secondary arithmetic processing units, the arbitration section outputs an acknowledgement signal to the selected one of the secondary arithmetic processing units.

5. The signal processing system according to claim 4, further comprising:
    an access blocking setup acceptance section that accepts access blocking requests from the central processing units; and
    an access blocking section that blocks output of the acknowledgement signal to the selected one of the secondary arithmetic processing units that transmitted the one of the access request signals to the arbitration section when the access blocking setup acceptance section accepts an access blocking request from the one of the central processing units that is the origin of controlling the selected one of the secondary arithmetic processing unit.

6. The signal processing system according to claim 5, wherein the central processing units transmit the access blocking requests to the access blocking setup acceptance section before issuing the reset requests.

7. The signal processing system according to claim 5, wherein the access blocking setup acceptance section nullifies the accepted access blocking requests upon completion of the reset process, and wherein the access blocking section outputs the acknowledgement signal to the selected one of secondary arithmetic processing units that transmitted the one of the access request signals to the arbitration section after the access blocking setup acceptance section nullifies the access blocking request from the one of the central processing units.

8. The signal processing system according to claim 2, further comprising:
    an exclusive mode acceptance section to accept an exclusive mode setting from at least one of the central processing units,
    wherein, when the exclusive mode acceptance section accepts the exclusive mode setting from the at least one of the central processing units, the arbitration section selects the one of the secondary arithmetic processing units based on determining that the one of the secondary arithmetic processing units is being controlled by one of the at least one of the central processing unit, so that the selected one of the secondary arithmetic processing units starts the process execution section.

9. The signal processing system according to claim 8, wherein in response to selecting the one of the secondary arithmetic processing units, the arbitration section outputs an acknowledgement signal to the selected one of the secondary arithmetic processing units, and wherein the signal processing system further comprises:

an access blocking setup acceptance section to accept access blocking requests from the central processing units; and an access blocking section blocks output of the acknowledgement signal to the selected one of the secondary arithmetic processing units that 1) has transmitted the access request signal to one of the central processing units and 2) is controlled by the one of the central processing units when the access blocking setup acceptance section accepts an access blocking request from the one of the central processing units.

10. The signal processing system according to claim 9, wherein a first central processing unit, which is one of the central processing units and differs from the one of the at least one of the central processing units having performed the exclusive mode setting, transmits an access blocking request to the access blocking setup acceptance section before issuing the reset request.

11. The signal processing system according to claim 1, wherein the secondary arithmetic processing units each outputs a control origin identification signal to the reset control section.

12. The signal processing system according to claim 11, wherein the first secondary arithmetic processing unit controlled by the one of the central processing units performs a reset process when the one of the central processing units is the origin of controlling the first secondary arithmetic processing unit issues the reset request.

13. The signal processing system according to claim 1, wherein the reset control section does not perform the reset process when a first central processing unit identified in the control origin identification signal differs from the one of the central processing units being 1) the origin of controlling the first secondary arithmetic processing unit and 2) an origin of issuing the reset request accepted by the reset acceptance section.

14. The signal processing system according to claim 1, wherein, when the control origin identification signal indicates another central processing unit different from the one of the central processing units from which the reset acceptance section accepts the reset request, the reset control section resets a dedicated part of the another central processing unit in the signal processing circuit.

15. A signal processing circuit comprising:

a process execution section that is started by a secondary arithmetic processing unit to perform a signal process, the secondary arithmetic processing unit being controlled by a central processing unit;

a reset acceptance section that accepts a reset request from each of a plurality of central processing units, the plurality of central processing units including the central processing unit that controls the secondary arithmetic processing unit; and a reset control section that performs a reset process based on: a control origin identification signal that identifies the central processing unit as an origin of controlling the secondary arithmetic processing unit that starts the process execution section; and a reset request of the central processing unit accepted by the reset acceptance section.

* * * * *